(12) United States Patent
Yokoshima et al.

(10) Patent No.: US 7,974,363 B2
(45) Date of Patent: Jul. 5, 2011

(54) RECEIVER, RECEIVING METHOD, FILTER CIRCUIT, AND CONTROL METHOD

(75) Inventors: Hideki Yokoshima, Kanagawa (JP); Masayoshi Abe, Tokyo (JP); Yuya Kondo, Kanagawa (JP); Yukitoshi Sanada, Kanagawa (JP)

(73) Assignee: Sony Corporation, Tokyo (JP)

( * ) Notice: Subject to any disclaimer, the term of this patent is extended or adjusted under 35 U.S.C. 154(b) by 771 days.

(21) Appl. No.: 11/869,965

(22) Filed: Oct. 10, 2007

(65) Prior Publication Data
US 2008/0240316 A1 Oct. 2, 2008

(30) Foreign Application Priority Data

Oct. 11, 2006 (JP) ................ P2006-277685

(51) Int. Cl.
*H03K 9/00* (2006.01)
*H04L 27/00* (2006.01)
*H03M 1/12* (2006.01)
*H03M 3/00* (2006.01)
*H03M 1/66* (2006.01)

(52) U.S. Cl. ........ 375/316; 341/143; 341/155; 341/144; 341/150

(58) Field of Classification Search .................. 341/143, 341/155, 144, 150; 375/316
See application file for complete search history.

(56) References Cited

U.S. PATENT DOCUMENTS

| | | |
|---|---|---|
| 6,202,074 B1 | 3/2001 | Lipka |
| 6,504,498 B1 * | 1/2003 | O'Brien ............ 341/143 |
| 6,584,157 B1 | 6/2003 | Van Der Zwan et al. |
| 2003/0080888 A1 | 5/2003 | Muhammad et al. |
| 2004/0218693 A1 | 11/2004 | Hickling |

OTHER PUBLICATIONS

Ville Eerola et al., "Direct Conversion Using Lowpass Sigma-Delta Modulation", ISCAS, 1992, pp. 2653-2656.
K. Muhammad et al., "A Discrete-Time Bluetooth Receiver in a 0.13um Digital CMOS Process", ISSCC, 2004, pp. 268-269.
Khurram Muhammad et al., "Digital RF Processing: Toward Low-Cost Reconfigurable Radios", IEEE Communications Magazine, Aug. 2005, pp. 105-113.
P.P. Vaidyanathan, "Multirate Systems and Filter Banks", Prentice-Hall PTR.

* cited by examiner

*Primary Examiner* — David C. Payne
*Assistant Examiner* — Linda Wong
(74) *Attorney, Agent, or Firm* — Finnegan, Henderson, Farabow, Garrett and Dunner LLP

(57) ABSTRACT

A receiver supporting a plurality of radio communication systems having different specifications includes a setting unit, a clock generation circuit, a voltage-current conversion amplifier, a switch, integrators, an AD conversion circuit, and a feedback circuit. The setting unit sets a value suitable for a carrier frequency used in one selected radio communication system. The clock generation circuit generates a first clock having a first frequency and a second clock having a second frequency. The conversion amplifier converts an input voltage signal into a current signal. The switch switches between connection and disconnection modes in accordance with the first clock to output the current signal. Each integrator operates in accordance with the second clock and includes two or more switched capacitor circuits and an operational amplifier. The AD conversion circuit converts a signal supplied from the preceding integrator into digital form. The feedback circuit operates in accordance with the second clock.

11 Claims, 14 Drawing Sheets

PRIOR ART

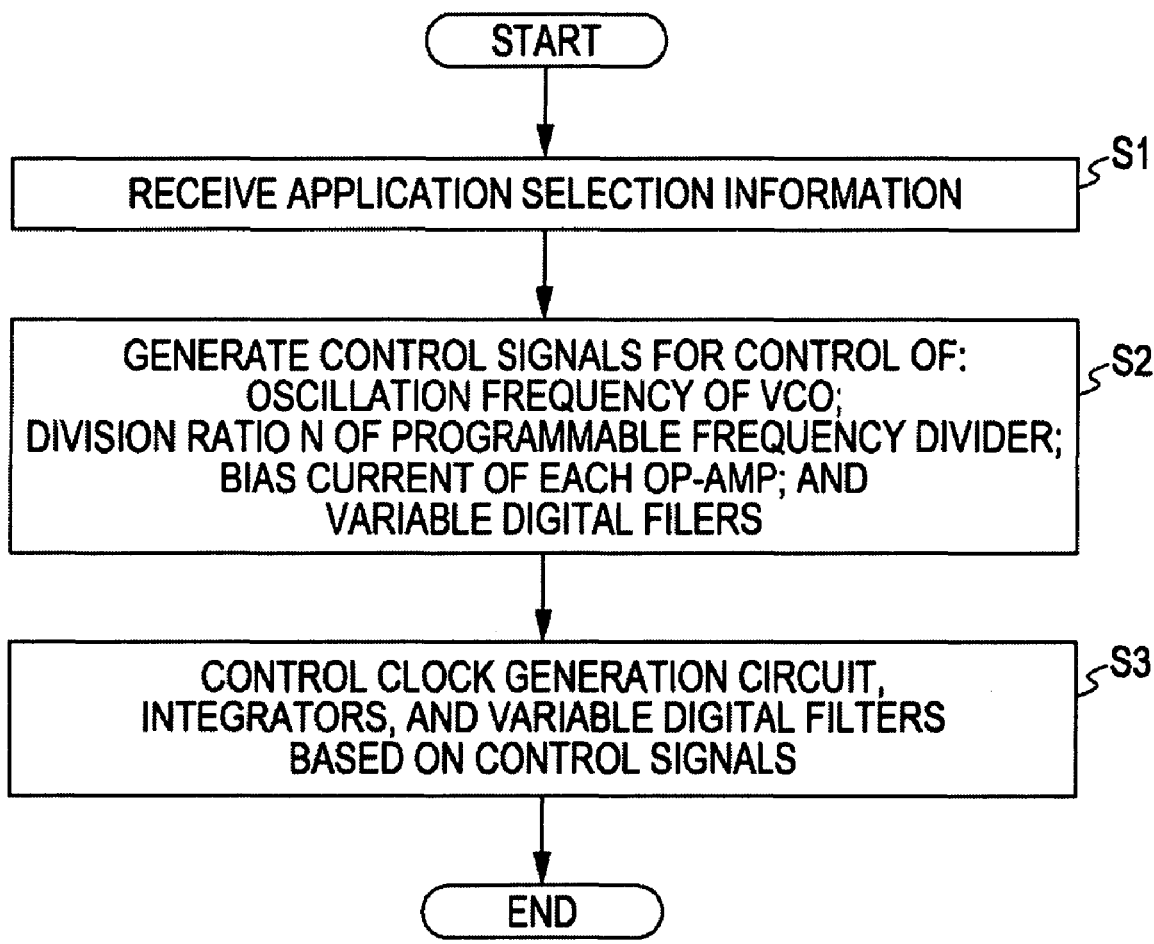

US 7,974,363 B2

RECEIVER, RECEIVING METHOD, FILTER CIRCUIT, AND CONTROL METHOD

CROSS REFERENCES TO RELATED APPLICATIONS

The present invention contains subject matter related to Japanese Patent Application JP 2006-277685 filed in the Japanese Patent Office on Oct. 11, 2006, the entire contents of which are incorporated herein by reference.

BACKGROUND OF THE INVENTION

1. Field of the Invention

The present invention relates to receivers, receiving methods, filter circuits, and control methods, and in particular, relates to a receiver in which circuitry with a simple structure, a small size, and low power consumption can be realized while required specifications of a plurality of radio communication systems are being met, a receiving method of the receiver, a filter circuit in which circuitry with a simple structure, a small size, and low power consumption can be realized while required specifications of a plurality of radio communication systems are being met, and a method of controlling the filter circuit.

2. Description of the Related Art

Trends toward finer pattern designing of semiconductor devices are advancing. For digital circuits, lower power consumption and higher speed operations can be performed with the advance. The footprints of digital circuits are also decreasing.

On the other hand, for analog circuits, a decrease in footprints, similar to that in digital circuits, is not expected. In addition, deterioration in characteristics caused by, for example, a reduction in power supply voltage and mismatch between transistors is inevitable.

In consideration of the above-described circumstances, shifting functions realized by analog circuits into a digital domain to reduce analog signal processing components is required for receivers.

The main functions in an analog domain of a receiver in radio communication include, for example, frequency conversion, orthogonal demodulation, channel selection, and automatic gain control (AGC). Efficiently shifting those functions to those in the digital domain needs an analog-to-digital (AD) converter having a high operating frequency and a wide dynamic range.

According to an approach to efficiently meeting the above-described requirements, a direct conversion method using low-pass sigma-delta ($\Sigma\Delta$) modulation is proposed. This method is disclosed in Ville Eerola, et al., "Direct Conversion Using Lowpass Sigma-Delta Modulation", ISCAS '92, pp. 2653-2656 (Non-patent Document 1).

FIG. 1 shows a related-art circuit disclosed in Non-patent Document 1.

A band pass filter (BPF) 1 limits the frequency band of an input signal S(t) supplied from an antenna (not shown) and then supplies the resultant signal to sigma-delta ($\Sigma\Delta$) analog-to-digital converters (ADCs) $2_I$ and $2_Q$.

The $\Sigma\Delta$ ADC $2_I$ operates in accordance with a first clock having a first frequency the same as the carrier frequency of the input signal S(t). The $\Sigma\Delta$ ADC $2_Q$ operates in accordance with a second clock that is $\pi/2$ out of phase with the first clock supplied to the $\Sigma\Delta$ ADC $2_I$. In each of the $\Sigma\Delta$ ADC $2_I$ and $2_Q$, the signal supplied from the BPF 1 is converted into a single-bit string that is a digital signal and the resultant signal is output.

The output signal of the $\Sigma\Delta$ ADC $2_I$ is supplied to a low pass filter (LPF) and decimator block $3_I$ and is subjected to filtering and decimation, in which the sampling rate is reduced at a predetermined rate. The resultant signal is output as an I-channel (I-CH) signal to a circuit at a subsequent stage.

Similarly, the output signal of the $\Sigma\Delta$ ADC $2_Q$ is supplied to an LPF and decimator block $3_Q$ and is subjected to filtering and decimation. The resultant signal is output as a Q-channel (Q-CH) signal to a circuit at a subsequent stage.

Advantages of this architecture are as follows:

(a) Since sampling is performed using the two clocks, i.e., the first clock having the first frequency the same as the carrier frequency and the second clock which is $\pi/2$ out of phase with the first clock, a function for orthogonal demodulation can be realized.

(b) Since the over sampling ratio (OSR) of a signal sampled using the frequency the same as the carrier frequency is high, a wide dynamic range can be realized using the $\Sigma\Delta$ ADCs advantageously having a simple structure. Generally, the carrier frequency is much higher than the signal band. Therefore, when sampling is performed at the same frequency as the carrier frequency, the OSR is high.

(c) Since the analog-to-digital (AD) converters having a wide dynamic range can be realized, functions for channel selection and AGC can be realized as digital domain functions.

However, the above-described architecture is not efficient in terms of power consumption. In the direct conversion method disclosed in Non-patent Document 1, the $\Sigma\Delta$ ADC is allowed to operate in accordance with the same frequency as the carrier frequency, so that the high OSR is ensured. In applications, such as Global System for Mobile Communications (GSM) and Bluetooth (trademark), using narrowband signals, the high OSR is not necessarily needed.

In terms of power consumption, operating each $\Sigma\Delta$ ADC at a more favorable operating frequency obtained by reducing a sampling rate for input signals to obtain a minimum OSR necessary for an application is more efficient than ensuring the high OSR.

A method of sampling input signals at a frequency substantially the same as the carrier frequency of the input signals and reducing the rate of the sampled signals to such a level that the signals can be used at the operating frequency of each $\Sigma\Delta$ ADC using a finite impulse response (FIR) filter or an infinite impulse response (IIR) filter is disclosed in K. Muhammad, et al., "A Discrete-Time Bluetooth Receiver in a 0.13 um Digital CMOS Process", ISSCC 2004, pp. 268-269 (Non-patent Document 2) and U.S. Patent Application No. 20030080888 (Patent Document 1).

FIG. 2 shows a related-art circuit disclosed in Non-patent Document 2 and Patent Document 1.

A transconductance amplifier 11 converts a voltage input signal supplied from an antenna (not shown) into a current signal and then supplies the signal to a switch 12.

The switch 12 is turned on or off using a frequency the same as the carrier frequency of the input signal. In the ON state, the switch 12 allows a capacitor Ch at a subsequent stage and one of capacitors, indicated by Cr, included in capacitor groups 13 and 14, e.g., a capacitor Cr2 to store charge (hereinafter, also referred to as a charge signal) as shown by an arrow $A_1$ in FIG. 2.

Referring to FIG. 2, the capacitor group 13 includes capacitors Cr1 to Cr4 and switches $S_1$ to $S_8$. An output of the switch 12 is connected to the switches $S_1$, $S_3$, $S_5$, and $S_7$ of the switches $S_1$ to $S_8$. To store charge output from the switch 12 to the capacitor Cr1, the switch $S_1$ is connected to a terminal $T_1$. To store charge to the capacitor Cr2, the switch $S_3$ is connected to a terminal $T_3$. To store charge to the capacitor $Cr2$, the switch $S_5$ is connected to a terminal $T_5$. To store charge to the capacitor $Cr4$, the switch $S_7$ is connected to a terminal $T_7$.

Among the switches $S_1$ to $S_8$, the switch $S_2$ is connected to a terminal $T_2$ when the charge stored in the capacitor $Cr1$ is output to a subsequent stage. The switch $S_4$ is connected to a terminal $T_4$ when the charge stored in the capacitor $Cr2$ is output to the subsequent stage. The switch $S_6$ is connected to a terminal $T_6$ when the charge stored in the capacitor $Cr3$ is output to the subsequent stage. The switch $S_8$ is connected to a terminal $T_8$ when the charge stored in the capacitor $Cr4$ is output to the subsequent stage.

The capacitor group 14 includes capacitors $Cr5$ to $Cr8$, which operate in a manner similar to those $Cr1$ to $Cr4$ in the capacitor group 13, and switches $S_{11}$ to $S_{18}$, which operate in a manner similar to those $S_1$ to $S_8$ in the capacitor group 13.

In the capacitor groups having the above-described structure, the respective capacitors Cr each store charge (charge signals) of eight samples and simultaneously output the charge to the subsequent stage, thus realizing functions of a SINC filter and a ⅛ decimator.

For example, when the capacitor $Cr1$ stores charge of eight samples, a switching operation is performed so that the capacitor $Cr1$ is turned off and the capacitor $Cr2$ stores charge. At that time, charge stored in the capacitor Ch is also supplied to the capacitor $Cr2$, thus realizing a function of an infinite impulse response (IIR) filter.

When the capacitor $Cr2$ stores charge of eight samples, the switching operation is performed so that the capacitor $Cr2$ is turned off and the capacitor $Cr3$ stores charge. When the four capacitors Cr in the capacitor group 13 each store the charge of eight samples by repeating the above-described operation, the switches included in the capacitor groups 13 and 14 and a switch 15 are switched so that all of the charge is stored into a capacitor Cb, thus realizing functions of a SINC filter and a ¼ decimator.

The charge stored in the capacitor Cb is supplied to a $\Sigma\Delta$ ADC arranged downstream of the capacitor Cb through a switch 16.

A current signal is supplied from the transconductance amplifier 11 to the switch 12 while the charge stored in the four capacitors Cr in the capacitor group 13 is stored into the capacitor Cb. Accordingly, when the switch 12 is in the ON state, a signal (charge) output from the switch 12 is supplied to the capacitor group 14.

Charge of eight samples is sequentially stored into each of the respective capacitors Cr included in the capacitor group 14 in order from the capacitor $Cr5$. When the capacitors $Cr5$ to $Cr8$, i.e., the four capacitors Cr store the charge, the capacitor group 13 operates in place of the capacitor group 14.

The circuit of FIG. 2 realizes a system shown in FIG. 3 by repeating the above-described operation. FIG. 3 shows the functions realized by the circuit 2 in a system.

In other words, the transconductance amplifier 11 in FIG. 2 is represented as a transconductance amplifier 21 in FIG. 3, the switch 12 in FIG. 2 is represented as a sampler block 22. A circuit portion including the capacitor Ch, the capacitor groups 13 and 14, the switch 15, and the capacitor Cb in FIG. 2 is represented as a SINC filter 23, a decimator block 24, an IIR/SINC filter 25, and a decimator block 26.

The decimator block 24 implements ⅛ decimation corresponding to the number of charge signals stored in one capacitor Cr included in the capacitor groups 13 and 14 in FIG. 2. The decimator block 26 implements ¼ decimation corresponding to the number of capacitors Cr arranged in one capacitor group.

SUMMARY OF THE INVENTION

In the above-described method of reducing the rate of signals sampled at a frequency substantially the same as the carrier frequency to the sampling rate suitable for each $\Sigma\Delta$ ADC at the preceding stage thereof, filtering is performed during decimation. Accordingly, the method is effective in the applications, such as GSM and Bluetooth, using narrowband signals. However, it is difficult to apply this method to applications, such as IEEE (Institute of Electrical and Electronics Engineers) 802.11b, 11g, and 11a, using wideband signals.

In the applications, such as IEEE802.11b, 11g, and 11a, using wideband signals, if sampling is performed using a clock having the same frequency as the carrier frequency of input signals, the OSR of an obtained signal is not so high. For example, in orthogonal frequency division multiplex (OFDM) mode of IEEE802.11g, since a carrier frequency Fcw is 2.4 GHz and a frequency bandwidth BW is 20 MHz, the OSR is approximately 120. To meet the required specification while maintaining simplicity of the circuit configuration of each $\Sigma\Delta$ ADC, an OSR of 60 or more is needed.

Therefore, it is difficult to arrange the circuit of reducing the sampling rate with heavy use of the IIR filter and SINC filters with decimation, as disclosed in Non-patent Document 2 and Patent Document 1, in a receiver equipped with an application using wideband signals.

In order to realize a multi-standard supporting receiver capable of covering both of narrowband signals for GSM or Bluetooth and wideband signals for IEEE802.11b, 11g, or 11a, it is necessary to design receiving paths suitable for various applications, switch among the receiving paths every application, and set filters in analog form for each application. Therefore, the capacitance of each switched capacitor circuit and control timing for the circuits are changed.

Realizing the requirements with the foregoing structure makes control of respective components complicated and also makes the circuit configuration complicated, resulting in an increase in the footprint of the circuit.

The present invention is made in consideration of the above-described circumstances. It is desirable to provide a circuit with a simple structure, a small size, and low power consumption while meeting required specifications of a plurality of radio communication systems.

According to a first embodiment of the present invention, there is a receiver supporting a plurality of radio communication systems having different specifications. The receiver includes the following elements. A setting unit sets a value suitable for a carrier frequency used in one radio communication system selected from among the radio communication systems. A clock generation circuit generates a first clock having a first frequency which is substantially the same as the carrier frequency and a second clock having a second frequency obtained by dividing the first frequency by the value set by the setting unit. A voltage-current conversion amplifier converts a receive voltage signal corresponding to a signal received through an antenna into a current signal. A switch switches between connection and disconnection modes in accordance with the first clock to output the current signal supplied from the voltage-current conversion amplifier. Integrators operate in accordance with the second clock. Each integrator receives as input signals a predetermined analog value and the result of operation obtained by the preceding integrator based on the current signal supplied from the switch, and includes two or more switched capacitor circuits and an operational amplifier connected to the switched capacitor circuits. An AD conversion circuit converts a signal supplied from the preceding integrator into a digital value at each of the leading and trailing edges of the second clock. A feedback circuit operates in accordance with the second clock and feeds a value corresponding to the digital value obtained by conversion through the AD conversion circuit as the predetermined analog value back to each of the integrators.

The receiver may further include a first receiving path that operates in accordance with the first or second clock, and a second receiving path that operates in accordance with a clock having a frequency, which is π/2 out of phase with the first frequency of the first clock, and another clock obtained by dividing the frequency, which is π/2 out of phase with the first frequency, by the value set by the setting unit. Each receiving path may include the voltage-current conversion amplifier, the switch, the integrators, the AD conversion circuit, and the feedback circuit.

The receiver may further include a second-order sigma-delta modulator having a single-bit output.

The receiver may further include a regulation circuit that regulates the bias current of the operational amplifier in each integrator.

The receiver may further include a variable digital filter circuit that receives the digital value output from the AD conversion circuit.

In the receiver according to this embodiment, the setting unit may further generate a signal for control of the division ratio used for clock generation by the clock generation circuit, a signal for control of the bias current of the operational amplifier in each integrator, and a signal for control of the variable digital filter in accordance with one radio communication system selected from the radio communication systems.

According to a second embodiment of the present invention, there is provided a receiving method of a receiver supporting a plurality of radio communication systems having different specifications, the receiver including a voltage-current conversion amplifier that converts a receive voltage signal corresponding to a signal received through an antenna into a current signal, a switch that switches between connection and disconnection modes in accordance with a first clock having a first frequency to output the current signal supplied from the voltage-current conversion amplifier, and integrators that operate in accordance with a second clock having a second frequency, each integrator receiving as input signals a predetermined analog value and the result of operation obtained by the preceding integrator based on the current signal supplied from the switch and including two or more switched capacitor circuits and an operational amplifier connected to the switched capacitor circuits, the receiver further including an AD conversion circuit that converts a signal supplied from the preceding integrator into a digital value at each of the leading and trailing edges of the second clock, and a feedback circuit that operates in accordance with the second clock and feeds a value corresponding to the digital value obtained by conversion through the AD conversion circuit as the predetermined analog value back to each of the integrators. The method includes the steps of setting a value suitable for a carrier frequency used in one radio communication system selected from among the radio communication systems, and generating the first clock having the first frequency that is substantially the same as the carrier frequency and the second clock having the second frequency obtained by dividing the first frequency by the set value.

According to a third embodiment of the present invention, a filter circuit includes the following elements. A setting unit sets at least one value suitable for a predetermined frequency component included in an input voltage signal. A clock generation circuit generates a first clock having a first frequency which is substantially the same as the predetermined frequency component and a second clock having a second frequency obtained by dividing the first frequency by the set value. A voltage-current conversion amplifier converts the input voltage signal into a current signal. A switch switches between connection and disconnection modes to output the current signal supplied from the voltage-current conversion amplifier. An operation unit includes a plurality of integrators connected in multiple stages, the integrators processing the signal supplied from the switch. The switch operates in accordance with the first clock. Each integrator receives as input values a predetermined analog value and the result of operation obtained by the preceding integrator, includes a switched capacitor circuit and an operational amplifier connected to the switched capacitor circuit, and operates in accordance with the second clock.

According to a fourth embodiment of the present invention, there is provided a method of controlling a filter circuit including a voltage-current conversion amplifier that converts an input voltage signal into a current signal, a switch that switches between connection and disconnection modes to output the current signal supplied from the voltage-current conversion amplifier, and an operation unit that includes a plurality of integrators connected in multiple stages, the integrators processing the signal supplied from the switch, each integrator receiving as input values a predetermined analog value and the result of operation obtained by the preceding integrator and including a switched capacitor circuit and an operational amplifier connected to the switched capacitor circuit. The method includes the steps of setting at least one value suitable for a predetermined frequency component included in the input voltage signal, generating a first clock having a first frequency that is substantially the same as the predetermined frequency component and a second clock having a second frequency obtained by dividing the first frequency by the set value, operating the switch in accordance with the first clock, and operating the integrators in accordance with the second clock.

According to the first and second embodiments, a value suitable for a carrier frequency used in one radio communication system selected from among the radio communication systems is set. A first clock having a first frequency that is substantially the same as the carrier frequency and a second clock having a second frequency obtained by dividing the first frequency by the set value are generated.

According to the third and fourth embodiments, at least one value suitable for a predetermined frequency component included in an input voltage signal is set. A first clock having a first frequency that is substantially the same as the predetermined frequency component and a second clock having a second frequency obtained by dividing the first frequency by the set value are generated. The switch operates in accordance with the first clock. The integrators operate in accordance with the second clock.

According to the embodiments of the present invention, a circuitry with a simple structure, a small scale, and low power consumption can be realized while respective required specifications of a plurality of radio communication systems are being met.

BRIEF DESCRIPTION OF THE DRAWINGS

FIG. 16 is a flowchart explaining a process by a control circuit.

DESCRIPTION OF THE PREFERRED EMBODIMENTS

Figure 1:
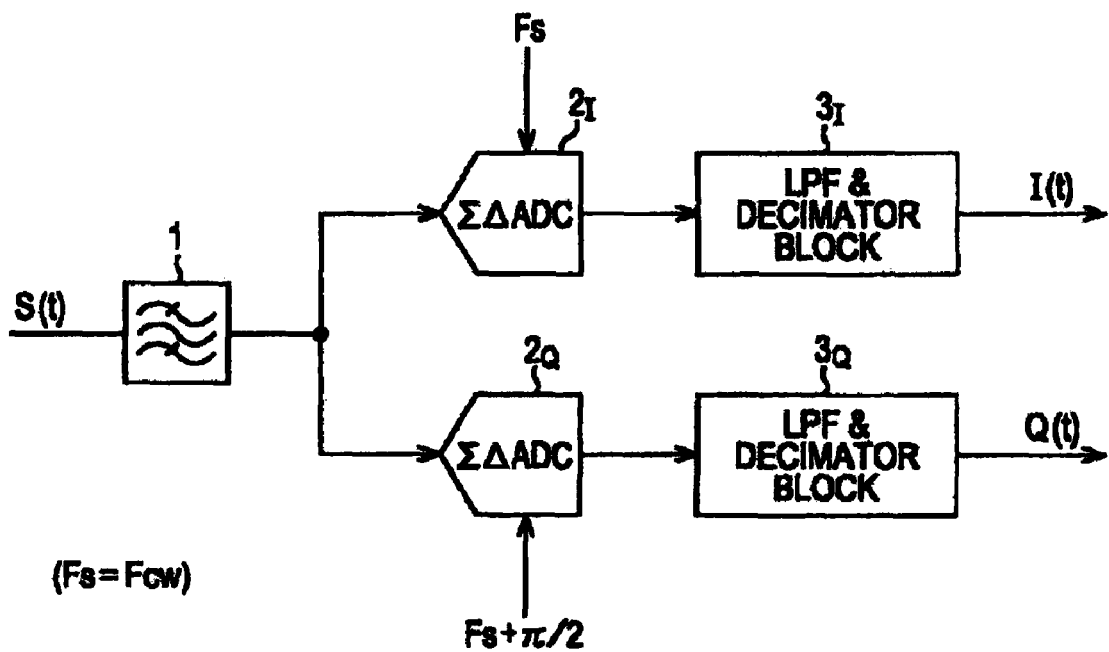
FIG. 1 is a diagram illustrating a related-art circuit.
Figure 2:
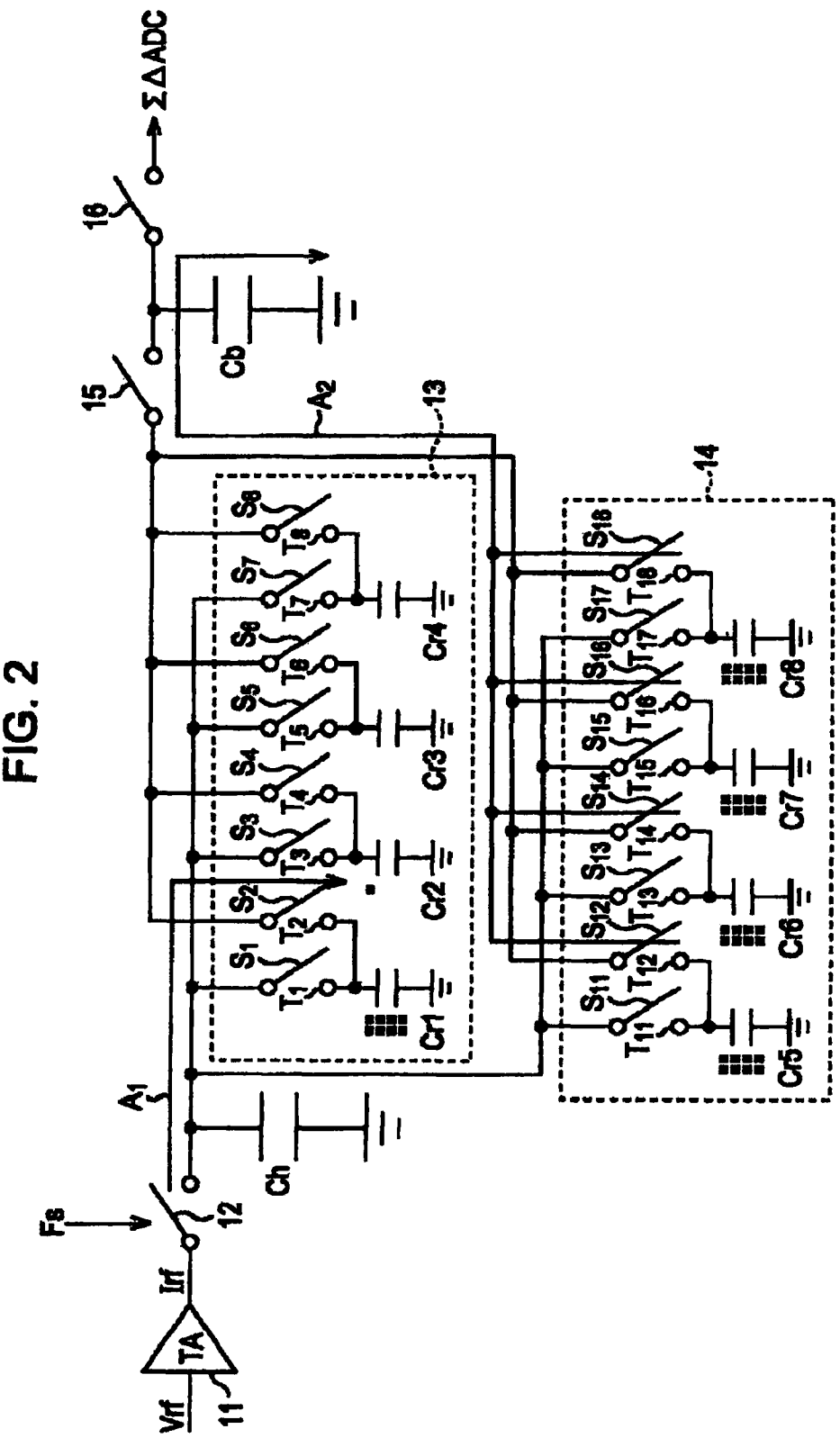
FIG. 2 is a diagram illustrating another related-art circuit.
Figure 3:
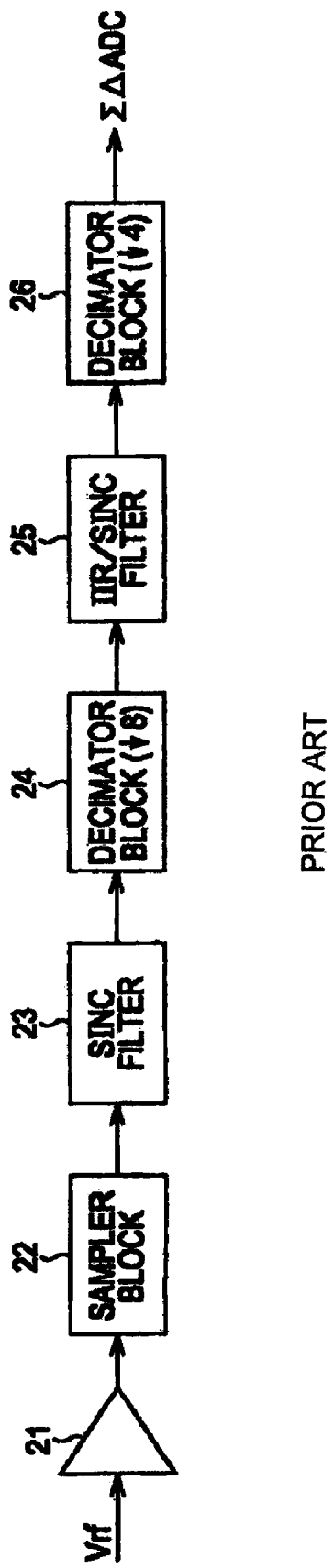
FIG. 3 is a diagram illustrating functions realized by the circuit of FIG. 2 in a system.
Figure 4:
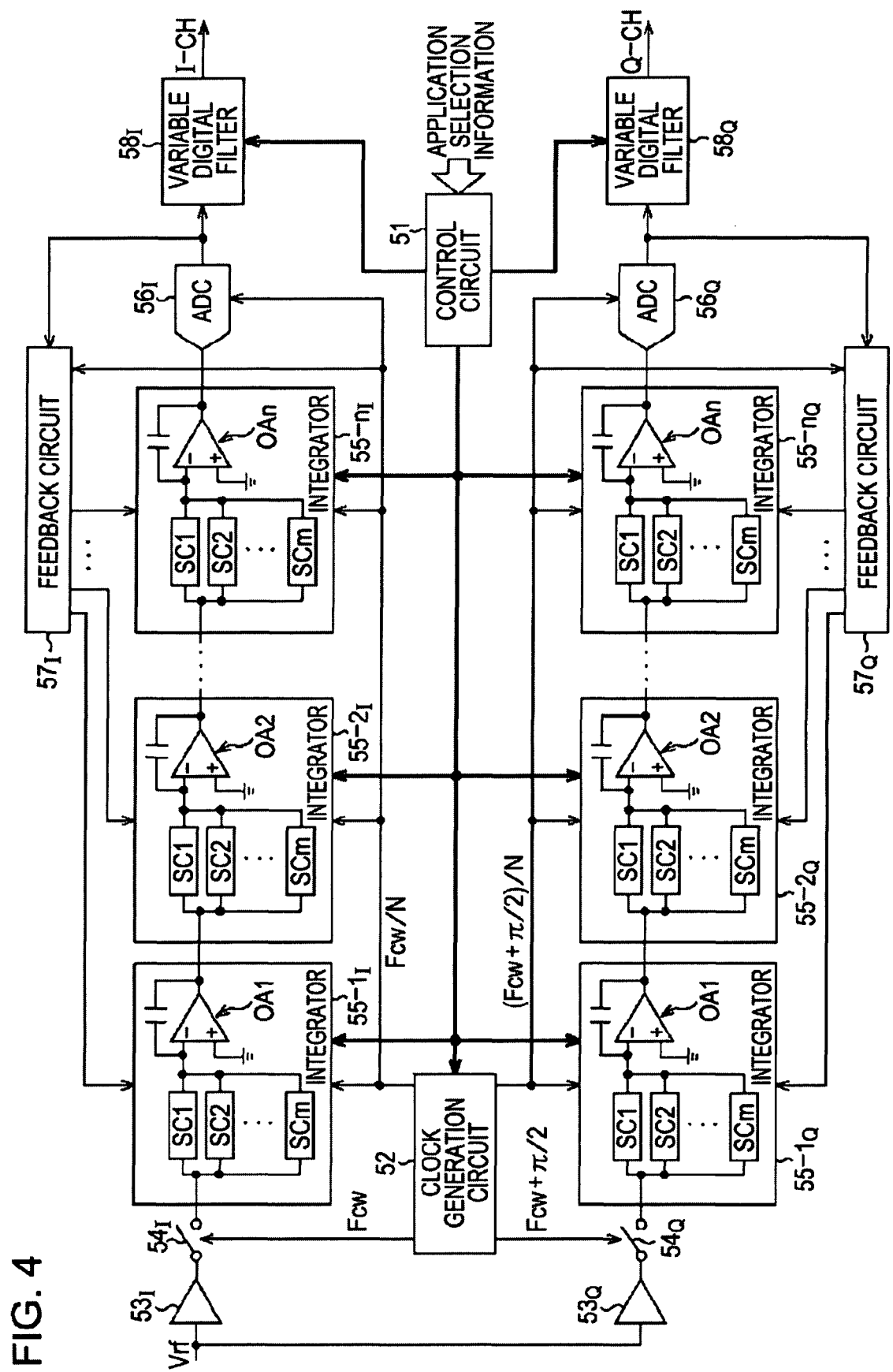
FIG. 4 is a diagram illustrating the structure of a ΣΔ orthogonal demodulator included in an receiver according to an embodiment of the present invention.

FIG. 4 illustrates the structure of a ΣΔ orthogonal demodulator arranged in a receiver according to an embodiment of the present invention.

The receiver including the ΣΔ orthogonal demodulator of FIG. 4 is a multi-standard supporting receiver (hereinafter, "multi-standard receiver") equipped with various applications, e.g., applications, such as IEEE802.11b, 11g, and 11a, using signals whose frequency bandwidth is relatively wide, and applications, such as GSM and Bluetooth, using signals whose frequency bandwidth is relatively narrow. The term "multi-standard" means a plurality of radio communication systems having different specifications.

Referring to FIG. 4, the ΣΔ orthogonal demodulator includes a control circuit 51, a clock generation circuit 52, a voltage-current conversion amplifier $53_I$, a switch $54_I$, integrators $55\text{-}1_I$ to $55\text{-}n_I$, an ADC $56_I$, a feedback circuit $57_I$, a variable digital filter $58_I$, a voltage-current conversion amplifier $53_Q$, a switch $54_Q$, integrators $55\text{-}1_Q$ to $55\text{-}n_Q$, an ADC $56_Q$, a feedback circuit $57_Q$, and a variable digital filter $58_Q$. The voltage-current conversion amplifier $53_I$, the switch $54_I$, the integrators $55\text{-}1_I$ to $55\text{-}n_I$, the ADC $56_I$, the feedback circuit $57_I$, and the variable digital filter $58_I$ serve as components of an I-channel (hereinafter, I-CH) path. The voltage-current conversion amplifier $53_Q$, the switch $54_Q$, the integrators $55\text{-}1_Q$ to $55\text{-}n_Q$, the ADC $56_Q$, the feedback circuit $57_Q$, and the variable digital filter $58_Q$ serve as components of a Q-channel (hereinafter, Q-CH) path.

When the control circuit 51 receives application selection information from a host controller, the application selection information indicating one application selected from among applications, the control circuit 51 controls the clock generation circuit 52, the integrators $55\text{-}1_I$ to $55\text{-}n_I$ and the variable digital filter $58_I$ serving as the components of the I-CH path, and the integrators $55\text{-}1_Q$ to $55\text{-}n_Q$ and the variable digital filter $58_Q$ serving as the components of the Q-CH path according to the selected application.

For example, the control circuit 51 outputs a signal for controlling the oscillation frequency of a voltage controlled oscillator (VCO) and a signal for controlling the division ratio N of a frequency divider to the clock generation circuit 52, the VCO and the frequency divider being arranged in the circuit 52. The control circuit 51 further outputs a signal for controlling the bias current of an operational amplifier (op-amp) to the integrators $55\text{-}1_I$ to $55\text{-}n_I$ and $55\text{-}1_Q$ to $55\text{-}n_Q$, the op-amp being arranged in each of the integrators. In addition, the control circuit 51 outputs a signal for controlling filter characteristic to the variable digital filters $58_I$ and $58_Q$.

For example, the control circuit 51 manages a table containing the oscillation frequencies of the VCO, the division ratios N of the frequency divider, the bias currents, and the filter characteristics associated with the respective applications.

The clock generation circuit 52 sets the oscillation frequency of the oscillator and the division ratio N of the frequency divider arranged therein on the basis of the control signals supplied from the control circuit 51 to generate a clock having a frequency Fcw, which is the same as the carrier frequency of signals used in the selected application or has a relatively small offset from (i.e., is substantially the same as) the carrier frequency, and a clock having a frequency Fcw/N obtained by dividing the frequency Fcw by the division ratio N.

In addition, the clock generation circuit 52 generates a clock having a frequency Fcw+π/2 that is π/2 out of phase with the clock having the frequency Fcw and a clock having a frequency (Fcw+π/2)/N obtained by dividing the frequency Fcw+π/2 of the above-described clock by the division radio N.

The clock generation circuit 52 outputs the clock having the frequency Fcw to the switch $54_I$, outputs the clock having the frequency Fcw/N to each of the integrators $55\text{-}1_I$ to $55\text{-}n_I$, the ADC $56_I$, and the feedback circuit $57_I$, outputs the clock having the frequency Fcw+π/2 to the switch $54_Q$, and outputs the clock having the frequency (Fcw+π/2)/N to each of the integrators $55\text{-}1_Q$ to $55\text{-}n_Q$, the ADC $56_Q$, and the feedback circuit $57_Q$.

In other words, the ΣΔ orthogonal demodulator of FIG. 4 is allowed to operate using the clocks with two different frequencies, i.e., the clock having the frequency Fcw and the clock having the frequency Fcw/N.

For example, assuming that an application using wideband signals is selected, a small value is set as the division ratio N and the respective components operate at a high speed in accordance with clocks having high frequencies generated by the clock generation circuit 52. On the other hand, assuming that an application using narrowband signals is selected, a large value is set as the division ratio N and the respective components operate at a low speed in accordance with clocks having low frequencies generated by the clock generation circuit 52.

The voltage-current conversion amplifier $53_I$, serving as the component of the I-CH path, converts an input signal, which is supplied as a voltage signal, into a current signal and outputs the resultant signal to the switch $54_I$.

For the input signal supplied to the voltage-current conversion amplifier $53_I$, a signal received through an antenna is subjected to various processes, e.g., band limitation by a BPF and amplification by a low noise amplifier (LNA) and the resultant signal is supplied as an input signal. The same input signal as that supplied to the voltage-current conversion amplifier $53_I$ is also supplied to the voltage-current conversion amplifier $53_Q$, serving as the component of the Q-CH path.

The switch $54_I$ is turned on or off in accordance with the clock having the frequency Fcw supplied from the clock generation circuit 52, thereby sampling the signals supplied from the voltage-current conversion amplifier $53_I$ at the frequency Fcw. The sampled signal is supplied to the integrator $55\text{-}1_I$.

The integrator $55\text{-}1_I$ includes a plurality of switched capacitor circuits SC1 to SCm (m is an integer of 2 or more) at an input stage and an op-amp OA1 at an output stage. The integrator $55\text{-}1_I$ operates in accordance with the clock having the frequency Fcw/N supplied from the clock generation circuit 52. The bias current of the op-amp OA1 is controlled in accordance with the control signal supplied from the control circuit 51.

In addition to the signals supplied from the switch $54_I$, the integrator $55\text{-}1_I$ receives a signal supplied from the feedback circuit $57_I$. As will be described later, the integrator $55\text{-}1_I$ realizes functions of a SINC filter and a decimator.

An output signal of the integrator $55\text{-}1_I$ is supplied to the integrator $55\text{-}2_I$, in which the supplied signal is subjected to signal processing similar to that in the integrator $55\text{-}1_I$. The resultant signal is supplied from the integrator $55\text{-}2_I$ to the integrator at the next stage. Input and output of signals are repeated a number of times corresponding to the number of integrators. A finally obtained signal output from the integrator $55\text{-}n_I$ is supplied to the ADC $56_I$.

The ADC $56_I$ operates in accordance with the clock having the frequency Fcw/N supplied from the clock generation circuit 52, converts the signal supplied from the integrator $55\text{-}n_I$ into digital form and outputs the resultant signal. The output signal of the ADC $56_I$ is supplied to the feedback circuit $57_I$ and the variable digital filter $58_I$.

The feedback circuit $57_I$ operates in accordance with the clock having the frequency Fcw/N supplied from the clock generation circuit 52, converts the digital signal supplied from the ADC $56_I$ into analog form, and outputs the resultant signal to each of the integrators $55\text{-}1_I$ to $55\text{-}n_I$.

The variable digital filter $58_I$ changes its characteristic in accordance with the control signal supplied from the control circuit 51 and filters the digital signal supplied from the ADC $56_I$. The variable digital filter $58_I$ outputs the resultant signal as an I-CH signal to a circuit at a subsequent stage.

The components of the Q-CH path operate in accordance with the clock, which is π/2 out of phase with that supplied to the components of the I-CH path, and the other clock which is obtained by dividing the frequency of the above-described clock by the division ratio N in a manner similar to the above-described components in the I-CH path. A signal obtained by the variable digital filter $58_Q$ is supplied as a Q-CH signal to a circuit at a subsequent stage.

Figure 5:
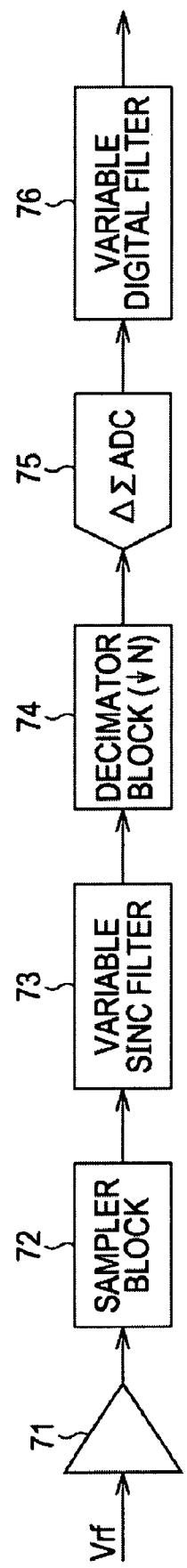
FIG. 5 is a diagram illustrating functions realized by circuitry of FIG. 4 in a system.

The circuitry of FIG. 4 realizes a system shown in FIG. 5. FIG. 5 illustrates functions realized by the circuitry of FIG. 4 in a system.

A voltage-current conversion amplifier 71 converts signals received through the antenna into current signals and supplies the resultant signals to a sampler block 72. The sampler block 72 samples the current signals and supplies the sampled signals to a variable SINC filter 73. For the characteristic of the variable SINC filter 73, a desired characteristic can be selected by appropriately changing the division ratio N for clock.

A decimator block 74 decimates the sampling rate of signals output from the variable SINC filter 73 by a factor of 1/N. A ΣΔ ADC 75 converts an analog signal output from the decimator block 74 into digital form and outputs the resultant signal to a circuit at a subsequent stage through a variable digital filter 76.

In other words, the voltage-current conversion amplifiers $53_I$ and $53_Q$ in FIG. 4 are represented by the voltage-current conversion amplifier 71 in FIG. 5 and the switches $54_I$ and $54_Q$ in FIG. 4 are represented by the sampler block 72 in FIG. 5.

A circuit portion including the integrators $55\text{-}1_I$ to $55\text{-}n_I$ and $55\text{-}1_Q$ to $55\text{-}n_Q$ and the ADCs $56_I$ and $56_Q$ is represented by the variable SINC filter 73, the decimator block 74, and the ΣΔ ADC 75 in FIG. 5. The variable digital filters $58_I$ and $58_Q$ in FIG. 4 are represented by the variable digital filter 76 in FIG. 5.

As described above, the arrangement of the components in FIG. 4 can realize the ΣΔ orthogonal demodulator of the multi-standard receiver without providing different arrangements for respective radio communication systems. Further, the ΣΔ orthogonal demodulator can be controlled using clocks having only two different frequencies.

The respective components in FIG. 4 will now be described.

Figure 6:
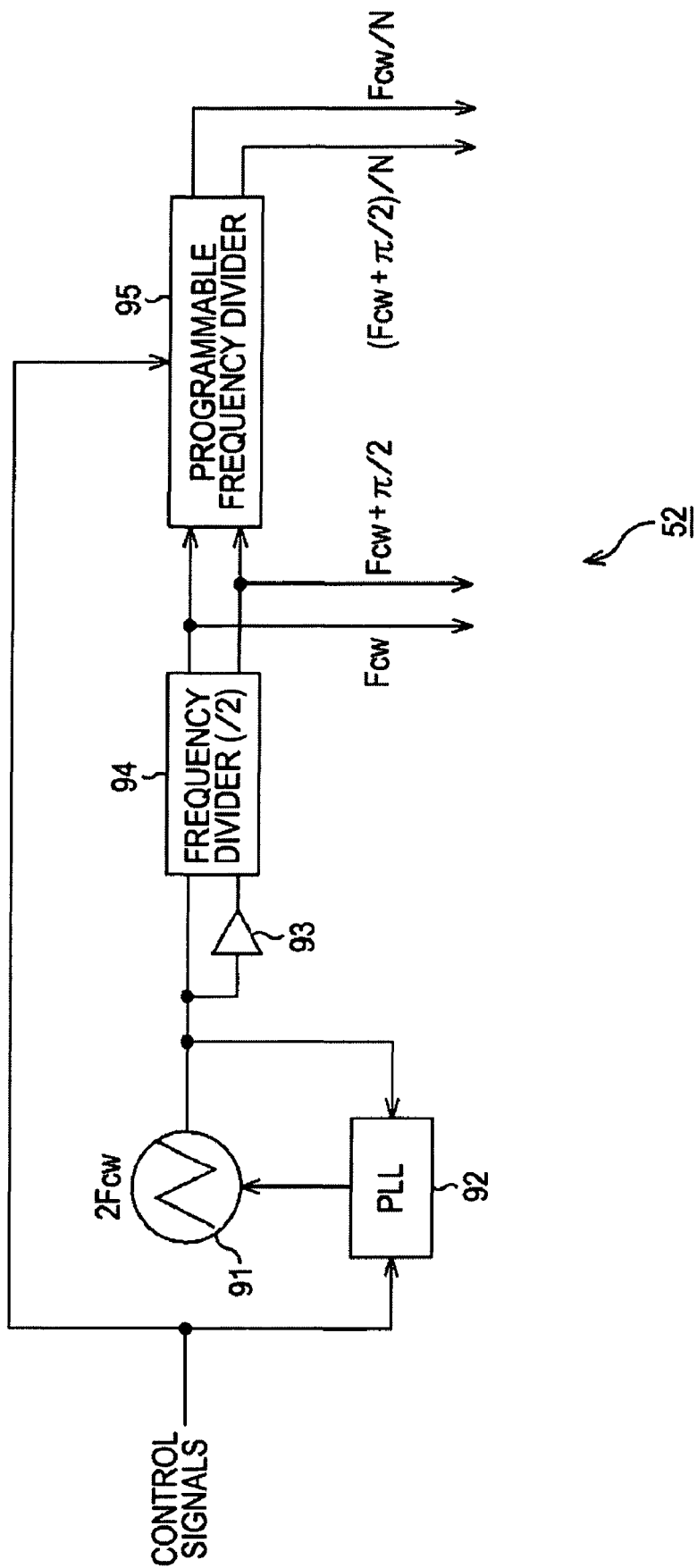
FIG. 6 is a diagram illustrating the structure of a clock generation circuit in FIG. 4.

FIG. 6 illustrates the structure of the clock generation circuit 52 in FIG. 4.

Referring to FIG. 6, the clock generation circuit 52 includes a VCO 91, a phase locked loop (PLL) 92, an inverter circuit 93, a frequency divider 94, and a programmable frequency divider 95. The oscillation-frequency control signal supplied from the control circuit 51 is input to the PLL 92 and the division-ratio-N control signal supplied therefrom is input to the programmable frequency divider 95.

The PLL 92 sets the oscillation frequency of the VCO 91 to a value 2Fcw on the basis of the signal supplied from the control circuit 51. A clock having the frequency 2Fcw output from the VCO 91 is supplied to the inverter circuit 93 and the frequency divider 94.

The inverter circuit 93 inverts the polarity of the clock having the frequency 2Fcw supplied from the VCO 91 and outputs the resultant clock to the frequency divider 94.

The frequency divider 94 divides the non-inverted clock supplied from the VCO 91 and the inverted clock supplied from the inverter circuit 93 by 2 to generate a clock having a frequency Fcw and another clock having a frequency Fcw+π/2 which is π/2 out of phase with the above-described clock, and outputs the generated clocks.

The clock having the frequency Fcw and the other clock having the frequency Fcw+π/2 output from the frequency divider 94 are supplied to the programmable frequency divider 95. The clock having the frequency Fcw is also supplied to the switch $54_I$ in FIG. 4. The other clock having the frequency Fcw+π/2 is also supplied to the switch $54_Q$ in FIG. 4.

The programmable frequency divider 95 divides the clock having the frequency Fcw and the other clock having the frequency Fcw+π/2 supplied from the frequency divider 94 by $2^k$ (k is an integer of 1 or more) to generate clocks having divided frequencies obtained by dividing the frequency Fcw by $2^k$ and clocks having other divided frequencies obtained by dividing the frequency Fcw+π/2 by $2^k$. The programmable frequency divider 95 selects clocks obtained using the division ratio N from among the generated clocks, the division ratio N being indicated by the control signal supplied from the control circuit 51.

In other words, the programmable frequency divider 95 selects the clock having the frequency Fcw/N and the clock having the frequency (Fcw+π/2)/N. The programmable frequency divider 95 outputs the clock having the frequency Fcw/N to each of the integrators $55\text{-}1_I$ to $55\text{-}n_I$, the ADC $56_I$, and the feedback circuit $57_I$. Further, the programmable frequency divider 95 outputs the clock having the frequency (Fcw+π/2)/N to each of the integrators 55-1$_Q$ to 55-$n_Q$, the ADC 56$_Q$, and the feedback circuit 57$_Q$.

Figure 7:
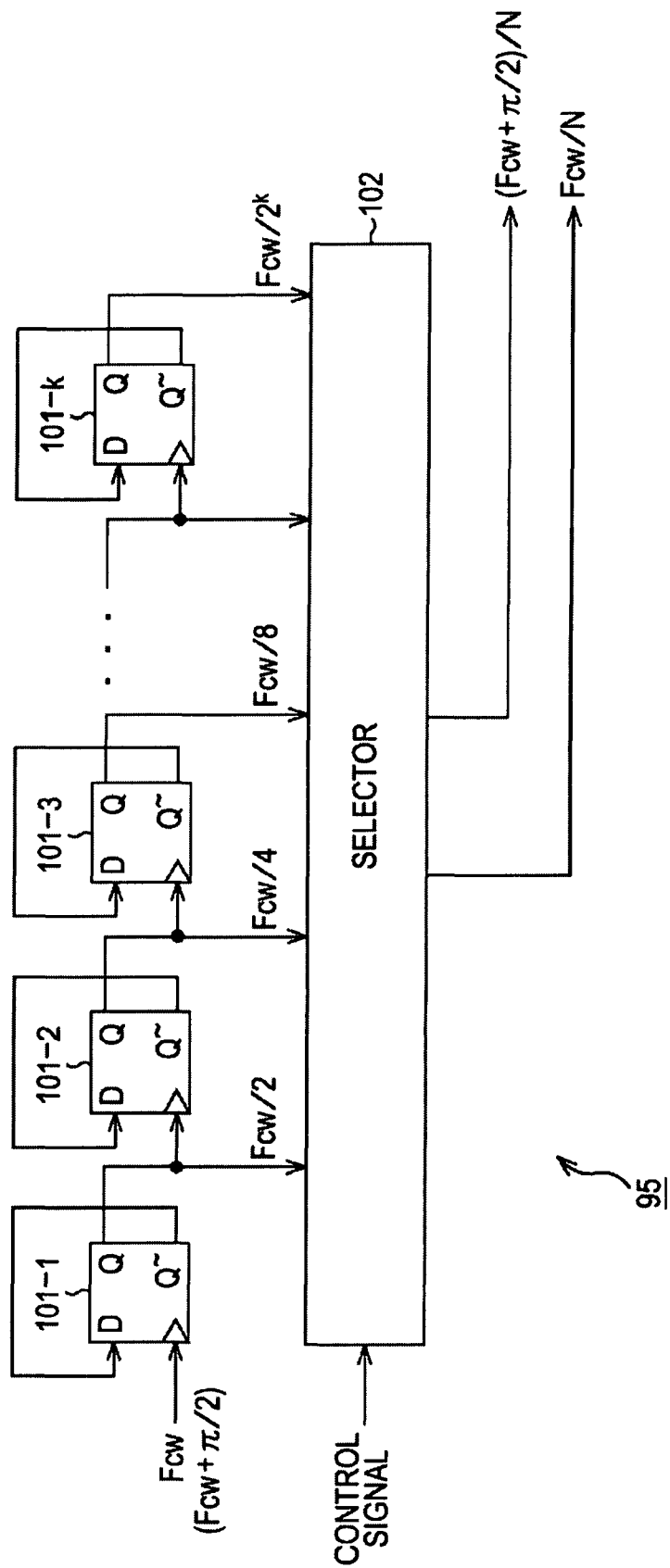
FIG. 7 is a diagram illustrating the structure of a programmable frequency divider in FIG. 6.

FIG. 7 illustrates the structure of the programmable frequency divider 95 in FIG. 6.

Referring to FIG. 7, the programmable frequency divider 95 includes flip-flops 101-1 to 101-$k$ and a selector 102.

The clock having the frequency Fcw supplied from the frequency divider 94 is input to the flip-flop 101-1, in which the frequency is divided by 2. A clock having the resultant frequency Fcw/2 is output to each of the flip-flop 101-2 and the selector 102. A non-inverting output terminal of the flip-flop 101-1 is connected to each of an input terminal of the flip-flop 101-2 and the selector 102. An inverting output terminal of the flip-flop 101-1 is connected to a D terminal of the flip-flop 101-1.

The clock having the frequency Fcw/2 output from the flip-flop 101-1 is supplied to the clock input terminal of the flip-flop 101-2. The frequency of this clock is further divided by 2 in the flip-flop 101-2, thus producing a clock having a frequency Fcw/4. The obtained clock is output from the flip-flop 101-2 to each of the flip-flop 101-3 and the selector 102. A non-inverting output terminal of the flip-flop 101-2 is connected to an input terminal of the flip-flop 101-3 and the selector 102.

In each of the other flip-flops, similarly, a clock supplied from the flip-flop at the preceding stage is frequency-divided by 2 and the resultant clock is output to each of the flip-flop at the subsequent stage and the selector 102.

The selector 102 selects the clock obtained using the division ratio N, which is indicated by the control signal supplied from the control circuit 51, from among the clocks generated by and supplied from the flip-flops 101-1 to 101-$k$ and outputs the selected clock having the frequency Fcw/N to each of the integrators 55-1$_I$ to 55-$n_I$, the ADC 56$_I$, and the feedback circuit 57$_I$.

For example, it is assumed that an application using wideband signals is selected and "4" is set as a value N. The selector 102 selects the clock having the frequency Fcw/4 supplied from the flip-flop 101-2 as a clock to be output to the respective components. It is assumed that an application using narrowband signals is selected and "8" is set as the value N. The selector 102 selects the clock having the frequency Fcw/8 supplied from the flip-flop 101-3 as a clock to be output to the respective components.

As described above, when a plurality of flip-flops are provided and a clock is selected from among clocks frequency-divided by 2 in the respective flip-flops, so that the clock having a frequency divided by the division ratio N can be supplied to the respective components with this simple structure.

The programmable frequency divider 95 further includes flip-flops for generating a clock having a frequency (Fcw+π/2)/$2^k$ on the basis of the clock having the frequency Fcw+π/2 supplied from the frequency divider 94. The selector 102 selects the clock having the frequency (Fcw+π/2)/N from among the clocks supplied from those flip-flops and outputs the selected clock to each of the integrators 55-1$_Q$ to 55-$n_Q$, the ADC 56$_Q$, and the feedback circuit 57$_Q$.

Figure 8:
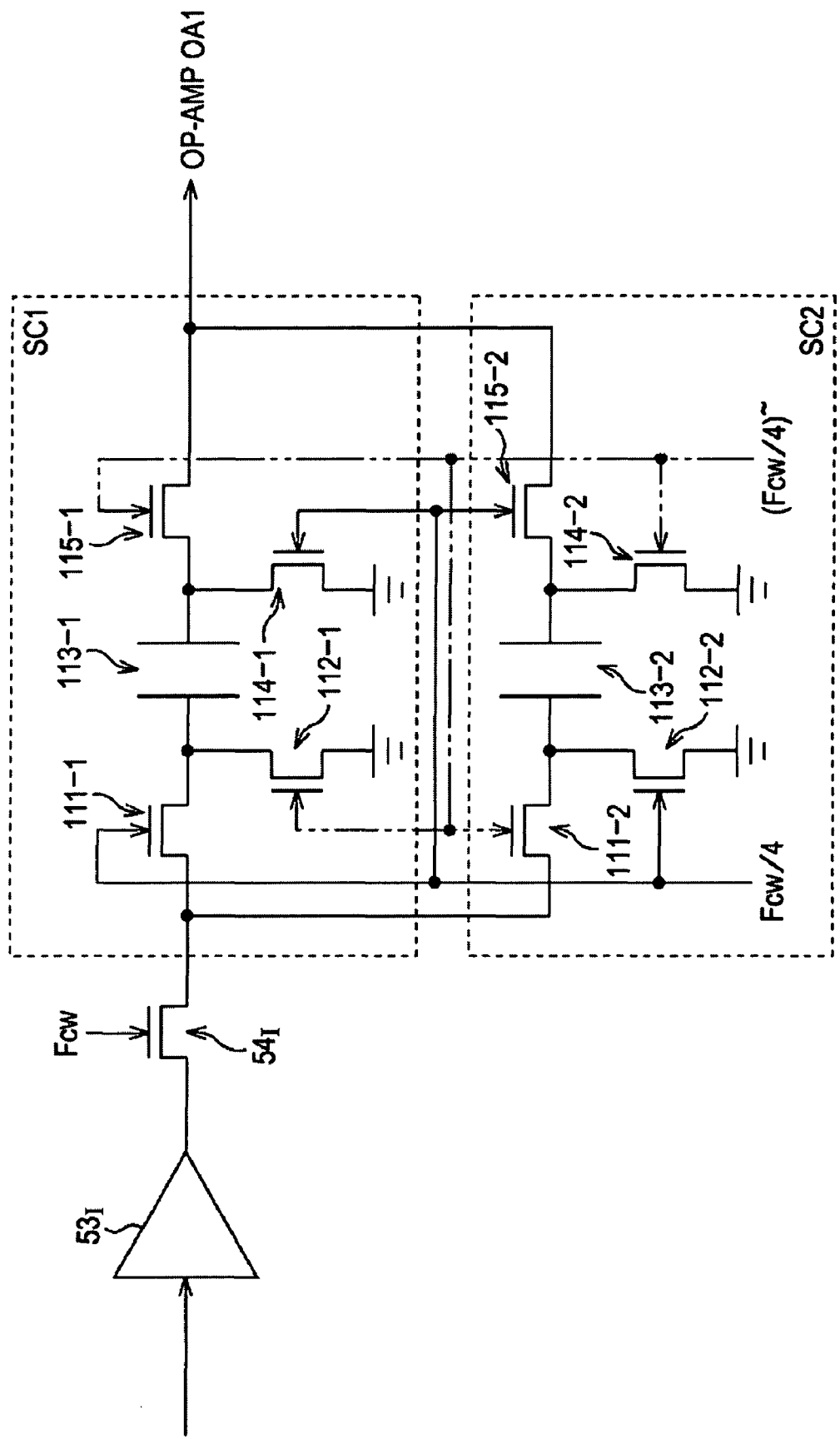
FIG. 8 is a diagram illustrating the structures of switched capacitor circuits included in an integrator in FIG. 4.

FIG. 8 illustrates the structure of the switched capacitor SC1 arranged in the integrator 55-1$_I$ in FIG. 4. In the following description, the structures of the components of the I-CH path will be mainly explained. The components of the Q-CH path have the same structures.

Referring to FIG. 8, the switch 54$_I$, which is equivalent to an initial switch switching between ON and OFF states in accordance with the clock having the frequency Fcw supplied from the clock generation circuit 52, is connected to the switched capacitor circuits SC1 and SC2 in parallel. The switched capacitor circuits SC1 and SC2 each operate in accordance with a clock having a frequency that is 1/N as high as the frequency Fcw. FIG. 8 illustrates the two switched capacitor circuits SC1 and SC2 arranged in the integrator 55-1$_I$.

Referring to FIG. 8, the upper switched capacitor circuit SC1 includes switches 111-1 and 112-1, a capacitor 113-1, and switches 114-1 and 115-1. When the switches 111-1 and 114-1 are in the ON state and the switches 112-1 and 115-1 are in the OFF state, current passing through the switch 111-1 is supplied to the capacitor 113-1, so that charge is stored in the capacitor 113-1. When the switches 111-1 and 114-1 are in the OFF state and the switches 112-1 and 115-1 are in the ON state, the charge stored in the capacitor 113-1 is supplied to the op-amp OA1.

The lower switched capacitor circuit SC2 includes switches 111-2 and 112-2, a capacitor 113-2, and switches 114-2 and 115-2. When the switches 111-2 and 114-2 are in the ON state and the switches 112-2 and 115-2 are in the OFF state, current passing through the switch 111-2 is supplied to the capacitor 113-2, so that charge is stored in the capacitor 113-2. When the switches 111-2 and 114-2 are in the OFF state and the switches 112-2 and 115-2 are in the ON state, the charge stored in the capacitor 113-2 is supplied to the op-amp OA1.

One of the two switched capacitor circuits SC1 and SC2 is connected to an input of the integrator 55-1$_I$ and the other one is connected to an output thereof. Switching the respective switches between ON and OFF states in accordance with the clock having the frequency Fcw/N allows the switched capacitor circuits to change their connections with each other.

In FIG. 8, N is set to 4. The clock having the frequency Fcw/4 is supplied to each of the switches 111-1, 114-1, 112-2, and 115-2 and a clock (hereinafter, inverted clock) obtained by inverting the above-described clock having the frequency Fcw/4 is supplied to each of the switches 112-1, 115-1, 111-2, and 114-2.

When the switches 111-1, 114-1, 112-2, and 115-2 are turned on in accordance with the clock having the frequency Fcw/4 and the switches 112-1, 115-1, 111-2, and 114-2 are turned off in accordance with the inverted clock, the upper switched capacitor circuit SC1 is connected to the input of the integrator 55-1$_I$. At that time, the capacitor 113-1 stores charge. The switched capacitor circuit SC2 is connected to an input of the op-amp OA1 at the subsequent stage. In this instance, charge stored in the capacitor 113-2 is output to the op-amp OA1.

On the other hand, when the switches 111-1, 114-1, 112-2, and 115-2 are turned off in accordance with the clock having the frequency Fcw/4 and the switches 112-1, 115-1, 111-2, and 114-2 are turned on in accordance with the inverted clock, the lower switched capacitor circuit SC2 is connected to the input of the integrator 55-1$_I$, so that charge is stored in the capacitor 113-2. The upper switched capacitor circuit SC1 is connected to the input of the op-amp OA1. At that time, charge stored in the capacitor 113-1 is output to the op-amp OA1.

Figure 9:
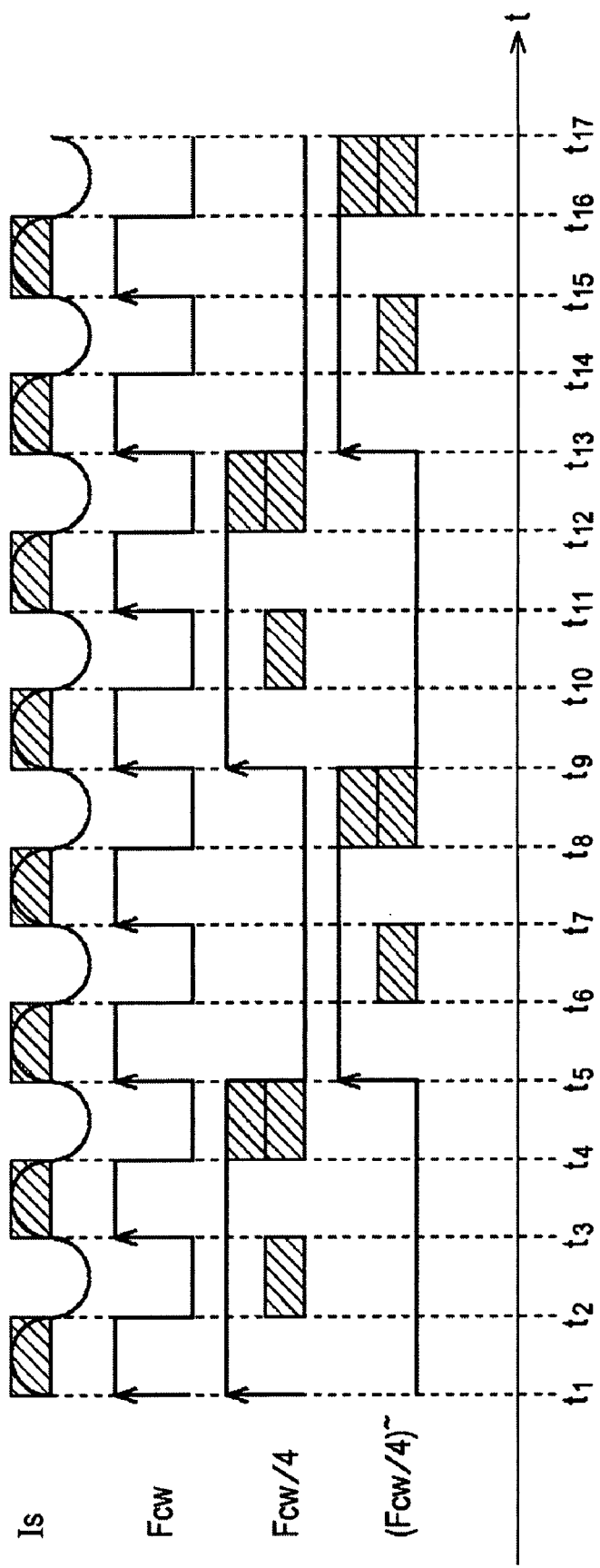
FIG. 9 is a timing chart.

FIG. 9 is a timing chart of signals flowing through the switch 54$_I$ and the switched capacitor circuits in FIG. 8.

The abscissa of FIG. 9 represents time. Waveforms in FIG. 9 correspond to an output signal Is, the clock having the frequency Fcw, the clock having the frequency Fcw/4, and the inverted clock obtained by inverting the clock having the frequency Fcw/4 in order from the top. The output signal Is is output from the voltage-current conversion amplifier 53$_I$.

The output signal Is is supplied to the switched capacitor circuit, which is connected to the input of the integrator $55\text{-}1_I$, for a period equivalent to the half-period of the frequency Fcw by switching the switch $54_I$ between ON and OFF states in accordance with the clock having the frequency Fcw.

Referring to FIG. 9, the output signal Is is supplied to either of the switched capacitor circuits for each of a period between time $t_1$ and time $t_2$, that between time $t_3$ and time $t_4$, that between time $t_4$ and time $t_5$, that between time $t_5$ and time $t_6$, ....

For a period between time $t_1$ and time $t_5$, the switched capacitor circuit SC1 is connected to the input of the integrator $55\text{-}1_I$ in accordance with the clock having the frequency Fcw/4 and the inverted clock. Charge is stored in the capacitor 113-1 in accordance with the output signals Is supplied for that period.

Specifically, the output signal Is is supplied for the period between time $t_1$ and time $t_2$, so that charge of one sample is stored in the capacitor 113-1 of the switched capacitor circuit SC1 connected to the input of the integrator $55\text{-}1_I$ for that period. The output signal Is is supplied for the period between time $t_4$ and time $t_5$, so that charge of one sample is further stored in the capacitor 113-1 of the switched capacitor circuit SC1 connected to the input of the integrator $55\text{-}1_I$ for that period. In FIG. 9, each hatched rectangle represents stored charge of one sample.

The switched capacitor circuit SC1 is connected to the input of the op-amp OA1 for a period between time $t_5$ and time $t_9$ in accordance with the clock having the frequency Fcw/4 and the inverted clock, so that charge of two samples stored in the capacitor 113-1 of the switched capacitor circuit SC1 is output to the op-amp OA1.

During the period between time $t_5$ and time $t_9$ during which the switched capacitor circuit SC1 is connected to the output of the integrator $55\text{-}1_I$, the switched capacitor circuit SC2 is connected to the input of the integrator $55\text{-}1_I$, so that charge of two samples is stored in the capacitor 113-2 of the switched capacitor circuit SC2 in accordance with the output signals Is supplied for that period. Since the connections of the switched capacitor circuits are changed for a period between time $t_9$ and time $t_{13}$, the charge stored in the capacitor 113-2 is output to the op-amp OA1. After that, the similar operation is repeated by the switched capacitor circuits SC1 and SC2.

As described above, since the switched capacitor circuits in the integrator $55\text{-}1_I$ operate in accordance with the clock having the frequency Fcw/4, each switched capacitor circuit is controlled so as to store charge of two samples and then output the stored charge to the subsequent stage. The switched capacitor circuits SC1 and SC2 alternately repeat the above-described operation, so that the switched capacitor circuits in the integrator $55\text{-}1_I$ realize a function of a SINC filter.

Figure 10:
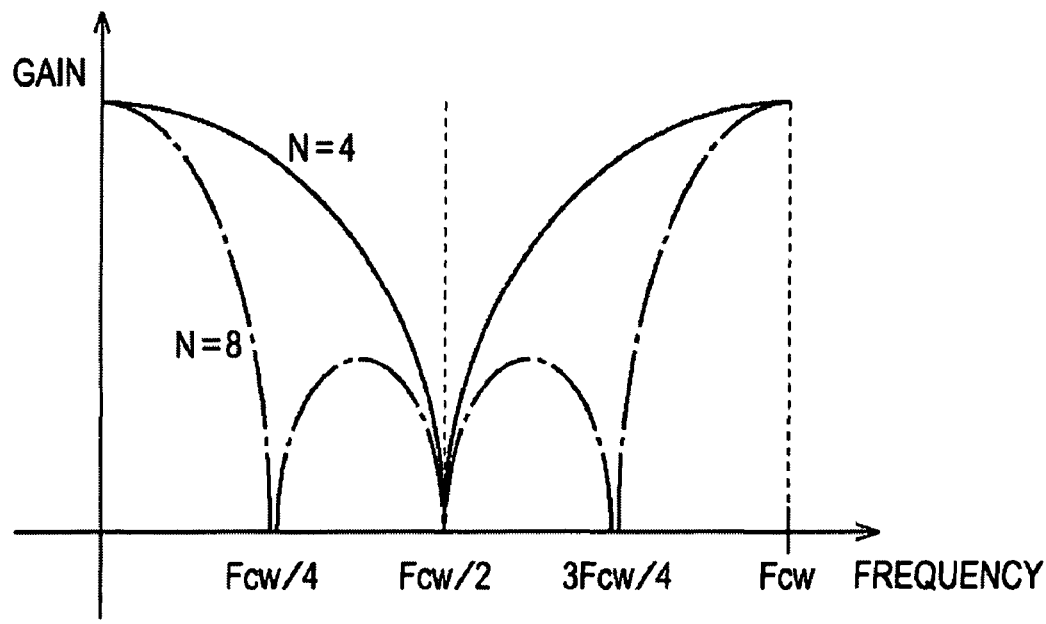
FIG. 10 is a graph showing the characteristics of a SINC filter.

FIG. 10 is a graph showing the characteristic of the SINC filter.

Referring to FIG. 10, the characteristic of the SINC filter realized by the switched capacitor circuits is controlled by changing the value N. FIG. 10 shows the frequency plotted against gain.

In FIG. 10, when N=4, the effect of adding two samples and averaging the two samples is obtained by the switched capacitor circuits, thus realizing a characteristic, indicated by a solid line, having a zero point at a frequency that is ½ times the frequency Fcw.

When N=8, an effect of adding four samples and averaging the four samples is obtained by the switched capacitor circuits, thus realizing a characteristic, indicated by an alternate long and short dash line, having zero points at frequencies which are ¼, 2/4, and ¾ times the frequency Fcw, respectively.

When the application using wideband signals is selected as described above, for example, "4" is selected as the value N and the switched capacitor circuits are controlled so as to realize the function of the SINC filter having the characteristic indicated by the solid line in FIG. 10.

When an application using narrowband signals is selected, for example, "8" is selected as the value N and the switched capacitor circuits are controlled so as to realize the function of the SINC filter having the characteristic indicated by the alternate long and short dash line in FIG. 10.

Figure 11:
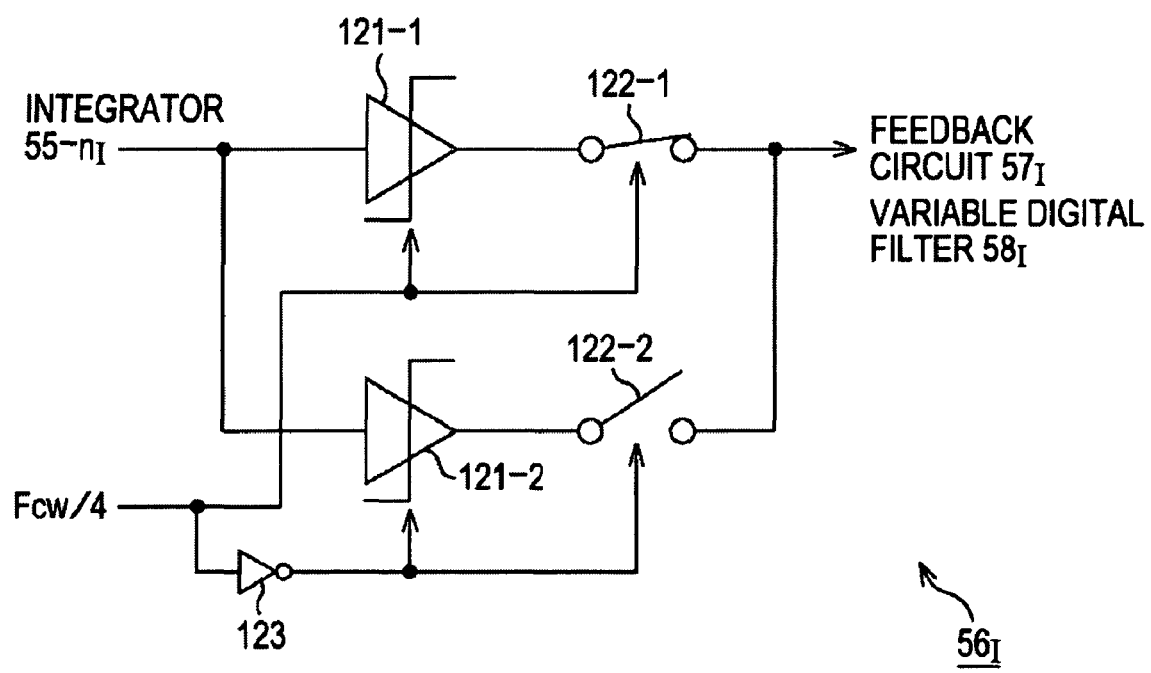
FIG. 11 is a diagram illustrating the structure of an analog-to-digital converter in FIG. 4.

FIG. 11 illustrates the structure of the ADC $56_I$ in FIG. 4.

Referring to FIG. 11, the ADC $56_I$ includes comparator circuits 121-1 and 121-2, switches 122-1 and 122-2, and an inverter circuit 123.

A signal output from the integrator $55\text{-}n_I$ is supplied to each of the comparator circuits 121-1 and 121-2 each having a single-bit output. Outputs of the comparator circuits 121-1 and 121-2 are supplied to the switches 122-1 and 122-2, respectively.

When N=4, the clock having the frequency Fcw/4 output from the clock generation circuit 52 is supplied to each of the comparator circuit 121-1 and the switch 122-1. In addition, the polarity of this clock is inverted by the inverter circuit 123 and the resultant clock is supplied to each of the comparator circuit 121-2 and the switch 122-2.

As described above, the two comparator circuits and the two selector circuits (switches) are provided and are controlled such that the circuits operate in accordance with the non-inverted clock and inverted clock each having the frequency Fcw/4, thus realizing a conversion rate of Fcw/2. In other words, the ADC $56_I$ outputs the result of AD conversion at each of the leading and trailing edges of the clock having the frequency Fcw/4.

For example, assuming that an application using wideband signals is selected, since a small value is selected as N, the ADC $56_I$ is controlled so as to perform AD conversion at a higher conversion rate than the case where an application using narrowband signals is selected.

Since the two comparator circuits and the two selector circuits are provided and are controlled such that the circuits operate in accordance with the non-inverted clock and the inverted clock each having the frequency Fcw/4, AD conversion can be performed using a clock having the same frequency Fcw/N as that used in other circuits. Advantageously, it is unnecessary to generate a clock having a different frequency for AD conversion.

An output of the ADC $56_I$ with the above-described structure is supplied to each of the feedback circuit $57_I$ and the variable digital filter $58_I$.

Figure 12:
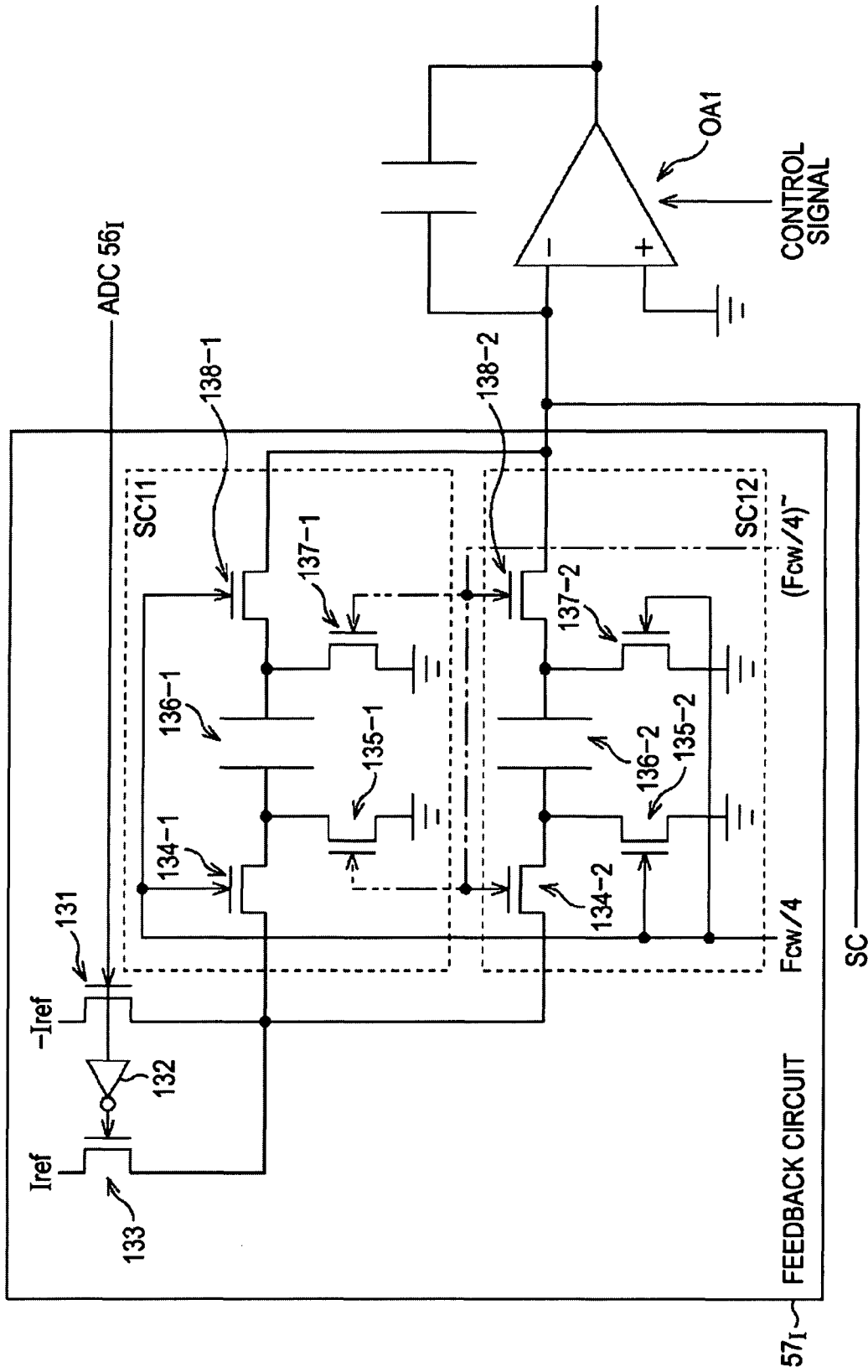
FIG. 12 is a diagram illustrating the structure of a feedback circuit in FIG. 4.

FIG. 12 illustrates the structure of the feedback circuit $57_I$ in FIG. 4.

Referring to FIG. 12, a signal output from the feedback circuit $57_I$ is fed back to the integrator $55\text{-}1_I$. Specifically, the output signal of the feedback circuit $57_I$ is supplied to the input of the op-amp OA1 in the integrator $55\text{-}1_I$. Similarly, the output signal of the feedback circuit $57_I$ is also supplied to each of the op-amps of the respective integrators $55\text{-}2_I$ to $55\text{-}n_I$. Further, the signal output from the switched capacitor circuit in the integrator $55\text{-}1_I$ is supplied to the input of the op-amp OA1. Furthermore, the control signal output from the control circuit 51 is supplied to the op-amp OA1. The control signal is used for controlling the bias current of the op-amp OA1.

To convert a single-bit signal output from the ADC $56_I$ into an analog signal, the output signal of the ADC $56_I$ is supplied to a switch 131 for switching current flowing from a current source −Iref between ON and OFF states. The polarity of the signal output from the ADC 56$_I$ is inverted by an inverter circuit 132 and the resultant signal is supplied to a switch 133 for switching current flowing from a current source Iref between ON and OFF states.

The switches 131 and 133 switch the currents between ON and OFF states in accordance with the signals supplied from the ADC 56$_I$, thereby selecting the current source corresponding to the digital signal. A signal output from the selected current source is supplied to switched capacitor circuits SC11 and SC12 in parallel.

Referring to FIG. 12, the upper switched capacitor circuit SC11 includes switches 134-1 and 135-1, a capacitor 136-1, and switches 137-1 and 138-1. When the switches 134-1 and 138-1 are turned on and the switches 135-1 and 137-1 are turned off, the signal input to the switched capacitor circuit SC11 is supplied to the op-amp OA1 through the switch 134-1, the capacitor 136-1, and the switch 138-1.

The lower switched capacitor circuit SC12 includes switches 134-2 and 135-2, a capacitor 136-2, and switches 137-2 and 138-2. When the switches 134-2 and 138-2 are turned on and the switches 135-2 and 137-2 are turned off, the signal input to the switched capacitor circuit SC12 is supplied to the op-amp OA1 through the switch 134-2, the capacitor 136-2, and the switch 138-2.

As described above, the switched capacitor circuits SC11 and SC12 are controlled in a butterfly network so as to operate in accordance with the clock having the frequency Fcw/N supplied from the clock generation circuit 52. One of the switched capacitor circuits SC11 and SC12 is connected to an input and output of the feedback circuit 57$_I$ and the other switched capacitor circuit is connected to ground. Switching the respective switches between ON and OFF states in accordance with the clock having the frequency Fcw/N allows the switched capacitor circuits to change their connections with each other.

In FIG. 12, N is set to 4. The clock having the frequency Fcw/4 is supplied to each of the switches 134-1, 138-1, 135-2, and 137-2. The inverted clock obtained by inverting the polarity of the clock having the frequency Fcw/4 is supplied to each of the switches 135-1, 137-1, 134-2, and 138-2.

When the switches 134-1, 138-1, 135-2, and 137-2 are turned on in accordance with the clock having the frequency Fcw/4 and the switches 135-1, 137-1, 134-2, and 138-2 are turned off in accordance with the inverted clock, the upper switched capacitor circuit SC11 is connected to the input and output of the feedback circuit 57$_I$ and the lower switched capacitor circuit SC12 is connected to the ground.

On the contrary, when the switches 134-1, 138-1, 135-2, and 137-2 are turned off in accordance with the clock having the frequency Fcw/4 and the switches 135-1, 137-1, 134-2, and 138-2 are turned on in accordance with the inverted clock, the lower switched capacitor circuit SC12 is connected to the input and output of the feedback circuit 57$_I$ and the upper switched capacitor circuit SC11 is connected to the ground.

Figure 13:
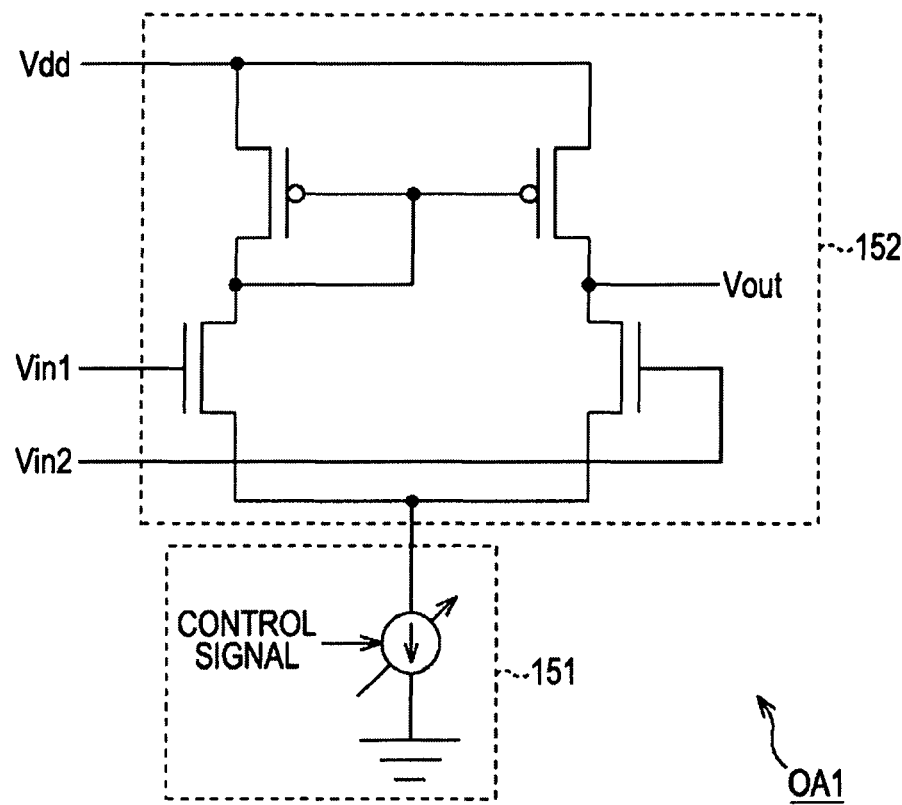
FIG. 13 is a diagram illustrating the structure of an operational amplifier included in the integrator in FIG. 4.

FIG. 13 illustrates the structure of the op-amp OA1.

Referring to FIG. 13, the op-amp OA1 includes a bias-current regulation circuit 151 and a differential amplifier 152. The control signal output from the control circuit 51 is supplied to the bias-current regulation circuit 151.

The bias-current regulation circuit 151 regulates the amount of current supplied to the differential amplifier 152 in accordance with the control signal from the control circuit 51. A signal output from the differential amplifier 152 is supplied to the output of the integrator.

Consequently, the amount of current used in the op-amp OA1 can be controlled according to the selected application such that the amount of current is increased when an application using wideband signals is selected and the amount of current is reduced when an application using narrowband signals is selected. In other words, power consumption can be optimized according to the selected application. For example, when the application using narrowband signals is selected, power consumption is lower than that in the case where the application using wideband signals is selected.

Figure 14:
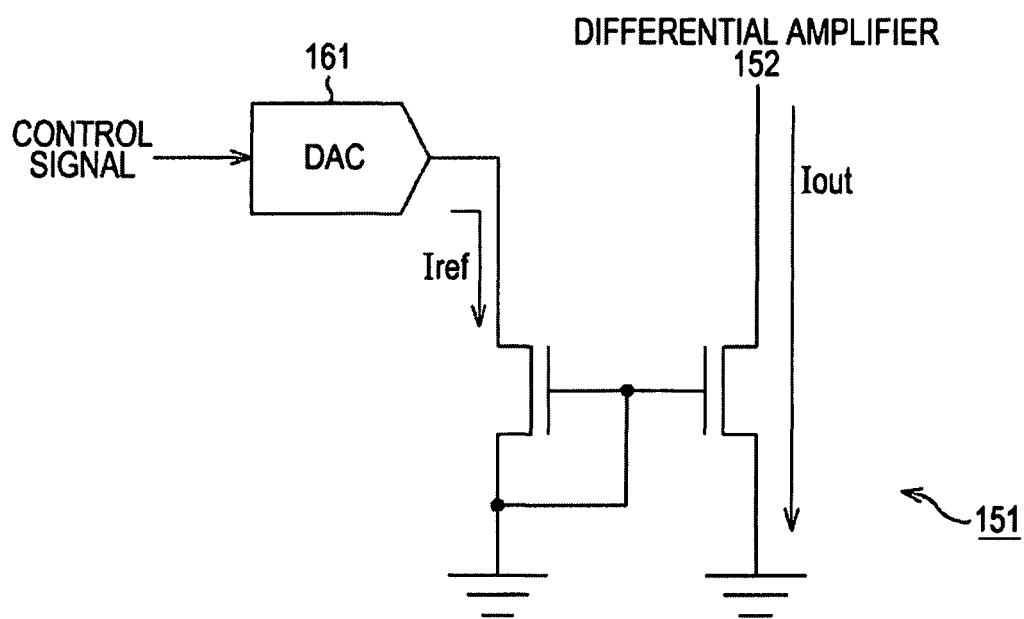
FIG. 14 is a diagram illustrating the structure of a bias-current regulation circuit in FIG. 13.

FIG. 14 illustrates the structure of the bias-current regulation circuit 151 in FIG. 13.

A digital-analog converter (DAC) 161 outputs current, whose amount is based on the control signal supplied from the control circuit 51, as a current Iref, so that the current is output to the differential amplifier 152.

The amount of current is controlled such that when an application using wideband signals is selected, the amount of current output as the current Iref is increased, and when an application using narrowband signals is selected, the amount of current output as the current Iref is reduced.

Figure 15:
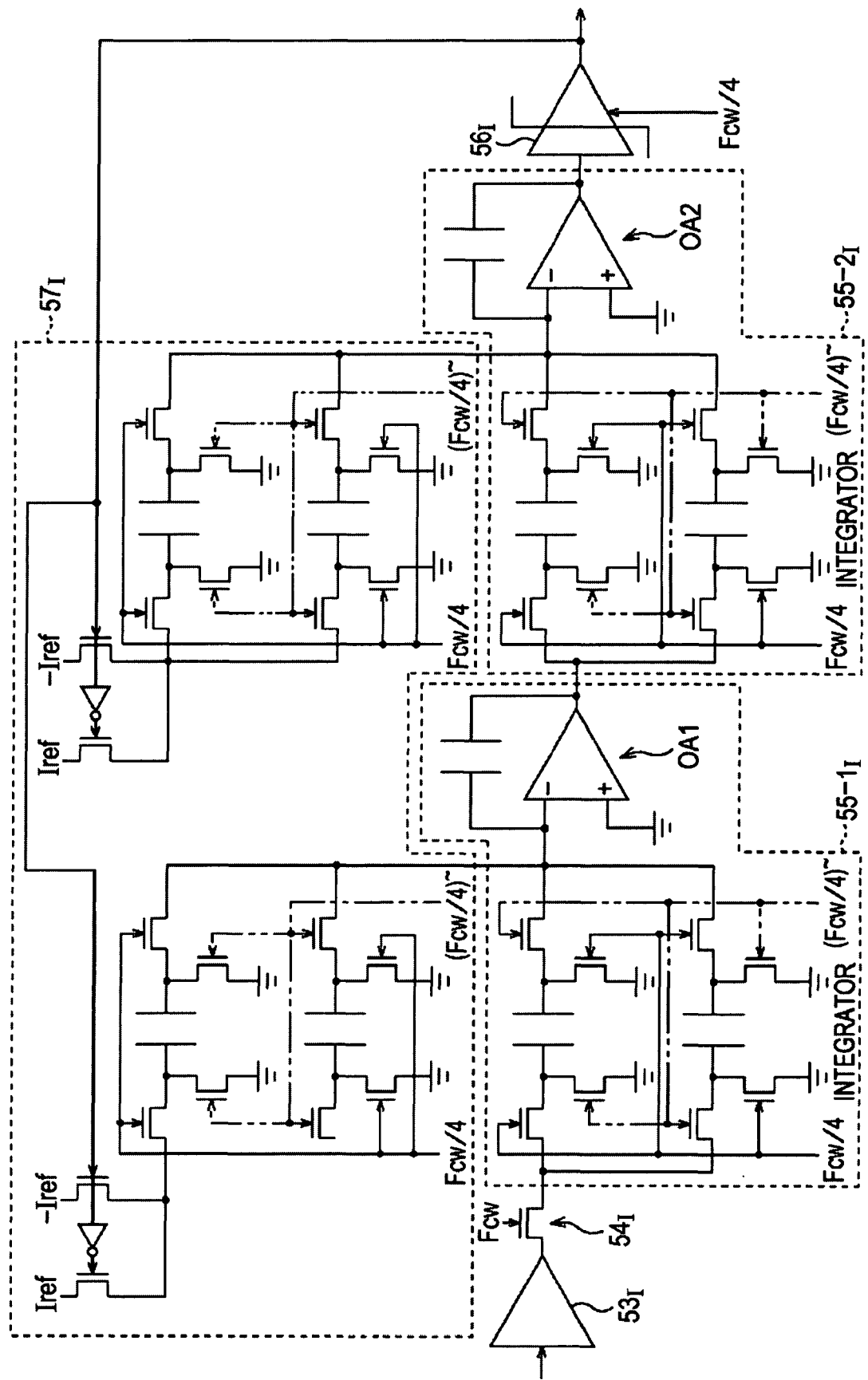
FIG. 15 is a diagram showing an example of circuitry constructed using second-order ΣΔ demodulation.

FIG. 15 illustrates an example of circuitry in which N is set to 4, the feedback circuit 57$_I$ has a single-bit output, and second-order ΣΔ modulation is used.

Referring to FIG. 15, the output of the switch 54$_I$ for sampling signals in accordance with the clock having the frequency Fcw is connected to the integrator 55-1$_I$ having the switched capacitor circuits described with reference to FIG. 8. The integrator 55-1$_I$ is connected to the subsequent integrator 55-2$_I$ having the same structure as that of the integrator 55-1$_I$. The integrator 55-2$_I$ is connected to the ADC 56$_I$ including the comparator circuits. The ADC 56$_I$ operates so as to convert data at the leading and trailing edges of the clock having the frequency Fcw/N as shown in, for example, FIG. 11.

The output of the ADC 56$_I$ is connected to the feedback circuit 57$_I$ and the variable digital filter 58$_I$. The feedback circuit 57$_I$ includes two circuit segments having the structure described with reference to FIG. 12. An output of the circuit segment on the left of the feedback circuit 57$_I$ is connected to the input of the op-amp OA1 in the integrator 55-1$_I$. An output of the circuit segment on the right thereof is connected to an input of an op-amp OA2 in the integrator 55-2$_I$.

The same circuitry as that shown in FIG. 15 is arranged at the preceding stage of the variable digital filter 58$_Q$ in the Q-CH path.

Since the multi-standard demodulator can be realized using the circuitry shown in FIG. 15 in this manner, the footprint of circuitry can be minimized as compared with the case where different circuitry for a plurality of radio communication systems are provided and the operation of any circuitry is controlled according to a selected application. Further, the circuitry can be easily controlled using clocks having only two frequencies.

A process by the control circuit 51 for controlling the circuitry with the above-described structure will now be described with reference to a flowchart of FIG. 16.

In step S1, the control circuit 51 receives application selection information transmitted form the host controller.

In step S2, the control circuit 51 generates a control signal for the oscillation frequency of the VCO in the clock generation circuit 52, a control signal for the division ratio N of the frequency divider in the clock generation circuit 52, a control signal for the bias current of each of the op-amps in the respective integrators 55-1$_I$ to 55-$n_I$ and 55-1$_Q$ to 55-$n_Q$, and a control signal for the characteristic of each of the variable digital filters $58_I$ and $58_Q$ according to the selected application with reference to the prepared table.

In step S3, the control circuit 51 outputs the control signal for the oscillation frequency of the VCO and that for the division ratio N of the frequency divider to the clock generation circuit 52, outputs the control signal for the bias current of each op-amp to each of the integrators $55\text{-}1_I$ to $55\text{-}n_I$ and $55\text{-}1_Q$ to $55\text{-}n_Q$, and further outputs the control signal for the filter characteristic to each of the variable digital filters $58_I$ and $58_Q$, thereby controlling the respective components.

The above-described simple control can realize the multi-standard receiver. Further, the receiver can be realized with a small circuit scale. Moreover, the bias current of each op-amp can be regulated while a required specification of each radio application is being met, thus optimizing the power consumption of the receiver.

It should be understood by those skilled in the art that various modifications, combinations, sub-combinations and alterations may occur depending on design requirements and other factors insofar as they are within the scope of the appended claims or the equivalents thereof.

What is claimed is:

1. A receiver supporting a plurality of radio communication systems having different specifications, the receiver comprising:
    setting means that sets a value suitable for a carrier frequency used in one radio communication system selected from among the radio communication systems;
    a clock generation circuit that generates a first clock having a first frequency which is substantially the same as the carrier frequency and a second clock having a second frequency obtained by dividing the first frequency by the value set by the setting means;
    a voltage-current conversion amplifier that converts a received voltage signal corresponding to a signal received through an antenna into a current signal;
    a switch that switches between connection and disconnection modes in accordance with the first clock to output the current signal supplied from the voltage-current conversion amplifier;
    integrators that operate in accordance with the second clock, each integrator receiving as input signals a predetermined analog value and the result of operation obtained by the preceding integrator based on the current signal supplied from the switch, each integrator including two or more switched capacitor circuits and an operational amplifier connected to the switched capacitor circuits;
    an AD conversion circuit that converts a signal supplied from the preceding integrator into a digital value at each of the leading and trailing edges of the second clock; and
    a feedback circuit that operates in accordance with the second clock and feeds a value corresponding to the digital value obtained by conversion through the AD conversion circuit as the predetermined analog value back to each of the integrators.

2. The receiver according to claim 1, further comprising:
    a first receiving path that operates in accordance with the first or second clock; and
    a second receiving path that operates in accordance with a clock having a frequency, which is π/2 out of phase with the first frequency of the first clock, and another clock obtained by dividing the frequency, which is π/2 out of phase with the first frequency, by the value set by the setting means,
    wherein each receiving path includes the voltage-current conversion amplifier, the switch, the integrators, the AD conversion circuit, and the feedback circuit.

3. The receiver according to claim 1 or 2, further comprising:
    a second-order sigma-delta modulator having a single-bit output.

4. The receiver according to claim 1 or 2, further comprising:
    a regulation circuit that regulates the bias current of the operational amplifier in each integrator.

5. The receiver according to claim 1, further comprising:
    a variable digital filter circuit that receives the digital value output from the AD conversion circuit.

6. The receiver according to claim 5, wherein the setting means further generates a signal for control of the division ratio used for clock generation by the clock generation circuit, a signal for control of the bias current of the operational amplifier in each integrator, and a signal for control of the variable digital filter in accordance with one radio communication system selected from the radio communication systems.

7. A receiving method of a receiver supporting a plurality of radio communication systems having different specifications, the method comprising:
    converting, by a voltage-current conversion amplifier of the receiver, a received voltage signal corresponding to a signal received through an antenna into a current signal;
    using a switch, switching between connection and disconnection modes in accordance with a first clock having a first frequency to output the current signal supplied from the voltage-current conversion amplifier;
    using integrators that operate in accordance with the second clock, receiving, by each integrator, input signals corresponding to a predetermined analog value and the result of operation obtained by a preceding integrator based on the current signal supplied from the switch, each integrator including two or more switched capacitor circuits and an operational amplifier connected to the switched capacitor circuits;
    converting, by an AD conversion circuit of the receiver, a signal supplied from the preceding integrator into a digital value at each of the leading and trailing edges of the second clock;
    feeding, by a feedback circuit that operates in accordance with the second clock, a value corresponding to the digital value obtained by conversion through the AD conversion circuit as the predetermined analog value back to each of the integrators;
    setting a value suitable for a carrier frequency used in one radio communication system selected from among the radio communication systems; and
    generating the first clock such that the first frequency is substantially the same as the carrier frequency and the second clock such that the second frequency is obtained by dividing the first frequency by the set value.

8. A filter circuit comprising:
    setting means that sets at least one value suitable for a predetermined frequency component included in an input voltage signal;
    a clock generation circuit that generates a first clock having a first frequency which is substantially the same as the predetermined frequency component and a second clock having a second frequency obtained by dividing the first frequency by the set value;
    a voltage-current conversion amplifier that converts the input voltage signal into a current signal;

a switch that switches between connection and disconnection modes to output the current signal supplied from the voltage-current conversion amplifier; and an operation unit including a plurality of integrators connected in multiple stages, the integrators processing the signal supplied from the switch, wherein the switch operates in accordance with the first clock, and each integrator receives as input values a predetermined analog value and the result of operation obtained by a preceding integrator, includes a switched capacitor circuit and an operational amplifier connected to the switched capacitor circuit, and operates in accordance with the second clock.

9. A method of controlling a filter circuit including a voltage-current conversion amplifier that converts an input voltage signal into a current signal, a switch that switches between connection and disconnection modes to output the current signal supplied from the voltage-current conversion amplifier, and an operation unit that includes a plurality of integrators connected in multiple stages, the integrators processing the signal supplied from the switch, each integrator receiving as input values a predetermined analog value and the result of operation obtained by a preceding integrator and including a switched capacitor circuit and an operational amplifier connected to the switched capacitor circuit, the method comprising the steps of:

setting at least one value suitable for a predetermined frequency component included in the input voltage signal;

generating a first clock having a first frequency that is substantially the same as the predetermined frequency component and a second clock having a second frequency obtained by dividing the first frequency by the set value;

operating the switch in accordance with the first clock; and operating the integrators in accordance with the second clock.

10. A receiver supporting a plurality of radio communication systems having different specifications, the receiver comprising:

a setting unit that sets a value suitable for a carrier frequency used in one radio communication system selected from among the radio communication systems;

a clock generation circuit that generates a first clock having a first frequency which is substantially the same as the carrier frequency and a second clock having a second frequency obtained by dividing the first frequency by the value set by the setting unit;

a voltage-current conversion amplifier that converts a receive voltage signal corresponding to a signal received through an antenna into a current signal;

a switch that switches between connection and disconnection modes in accordance with the first clock to output the current signal supplied from the voltage-current conversion amplifier;

integrators that operate in accordance with the second clock, each integrator receiving as input signals a predetermined analog value and the result of operation obtained by a preceding integrator based on the current signal supplied from the switch, each integrator including two or more switched capacitor circuits and an operational amplifier connected to the switched capacitor circuits;

an AD conversion circuit that converts a signal supplied from the preceding integrator into a digital value at each of the leading and trailing edges of the second clock; and a feedback circuit that operates in accordance with the second clock and feeds a value corresponding to the digital value obtained by conversion through the AD conversion circuit as the predetermined analog value back to each of the integrators.

11. A filter circuit comprising:

a setting unit that sets at least one value suitable for a predetermined frequency component included in an input voltage signal;

a clock generation circuit that generates a first clock having a first frequency which is substantially the same as the predetermined frequency component and a second clock having a second frequency obtained by dividing the first frequency by the set value;

a voltage-current conversion amplifier that converts the input voltage signal into a current signal;

a switch that switches between connection and disconnection modes to output the current signal supplied from the voltage-current conversion amplifier; and an operation unit including a plurality of integrators connected in multiple stages, the integrators processing the signal supplied from the switch, wherein the switch operates in accordance with the first clock, and each integrator receives as input values a predetermined analog value and the result of operation obtained by a preceding integrator, includes a switched capacitor circuit and an operational amplifier connected to the switched capacitor circuit, and operates in accordance with the second clock.

* * * * *